United States Patent
Tsirkin

(10) Patent No.: US 10,545,697 B1
(45) Date of Patent: Jan. 28, 2020

(54) REVERSE ORDER REQUEST QUEUEING BY PARA-VIRTUAL DEVICE DRIVERS

(71) Applicant: Red Hat, Inc., Raleigh, NC (US)

(72) Inventor: Michael Tsirkin, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/116,514

(22) Filed: Aug. 29, 2018

(51) Int. Cl.
  *G06F 3/06* (2006.01)
  *G06F 9/455* (2018.01)

(52) U.S. Cl.
  CPC .......... *G06F 3/0647* (2013.01); *G06F 3/0604* (2013.01); *G06F 3/0673* (2013.01); *G06F 9/45558* (2013.01); *G06F 3/0656* (2013.01)

(58) Field of Classification Search
  None
  See application file for complete search history.

(56) References Cited

U.S. PATENT DOCUMENTS

| | | | |
|---|---|---|---|
| 9,727,364 B2 | 8/2017 | Tsirkin | |
| 9,804,904 B2 | 10/2017 | Nelson | |
| 10,152,275 B1 * | 12/2018 | Tsirkin | ................. G06F 3/0613 |
| 2003/0026277 A1 | 2/2003 | Pate et al. | |
| 2014/0006685 A1 | 1/2014 | Peterson et al. | |
| 2017/0126549 A1 | 5/2017 | Paramasivam | |

* cited by examiner

*Primary Examiner* — Brian R Peugh
(74) *Attorney, Agent, or Firm* — K&L Gates LLP

(57) ABSTRACT

A system includes a memory including a ring buffer having a plurality of slots and a guest driver associated with the ring buffer, which is associated with a virtual device. The guest driver is configured to detect that the guest driver is running on the virtual device, receive a batch of requests having an initial request and a final request, walk the ring buffer starting from an original slot, identify a last request in the batch that can be accommodated by an available slot, walk the ring buffer backwards from an end slot associated with the last request to the original slot, and execute each respective request from the last request to the initial request for each respective slot from the end slot to the original slot. The end slot is either a slot associated with the final request ending the batch of requests or a slot preceding an unavailable slot.

20 Claims, 9 Drawing Sheets

REVERSE ORDER REQUEST QUEUEING BY PARA-VIRTUAL DEVICE DRIVERS

BACKGROUND

Computer systems may routinely copy memory entries from one memory to a different memory. For example, while forwarding incoming networking traffic to a physical or virtual machine, packets may be received and later copied to another memory location. Processors may execute instructions to read, write, and copy memory entries, such as packet addresses to forward networking traffic to different machines. For example, memory entries may be temporarily stored in ring buffers on a first-in-first-out basis before being copied to the memory associated with a different machine. Specifically, incoming networking traffic may be stored on a ring buffer and later copied to virtual machine memory.

SUMMARY

The present disclosure provides new and innovative systems and methods for reverse order request queueing by para-virtual device drivers. In an example, a system includes a memory including a ring buffer having a plurality of slots and a guest driver associated with the ring buffer. The ring buffer is associated with a virtual device and the guest driver is configured to detect that the guest driver is running on the virtual device, receive a batch of requests having an initial request and a final request ending the batch of requests, walk the ring buffer starting from an original slot, identify a last request in the batch of requests that can be accommodated by an available slot in the ring buffer, walk the ring buffer backwards from an end slot associated with the last request to the original slot, and execute each respective request from the last request to the initial request for each respective slot from the end slot to the original slot in the ring buffer. The end slot is either a first slot associated with the final request ending the batch of requests or a second slot preceding an unavailable slot.

In an example, a method includes detecting, by a guest driver, that the guest driver is running on a virtual device. Additionally, the guest driver receives a batch of requests having an initial request and a final request ending the batch of requests, walks a ring buffer starting from an original slot, identifies a last request in the batch of requests that can be accommodated by an available slot in the ring buffer, walks the ring buffer backwards from an end slot associated with the last request to the original slot, and executes each respective request from the last request to the initial request for each respective slot from the end slot to the original slot in the ring buffer. The end slot is either a first slot associated with the final request ending the batch of requests or a second slot preceding an unavailable slot.

In an example, a method includes determining, by a guest operating system, that a guest driver is running on a virtual device. The guest operating system receives a batch of requests having an initial request and a final request ending the batch of requests, tests one or more slots in a ring buffer starting at an original slot, identifies a last request in the batch of requests that can be accommodated by an available slot in the ring buffer, advances from an end slot associated with the last request to the original slot, and executes each respective request from the last request to the initial request for each respective slot from the end slot to the original slot in the ring buffer. The end slot is either a first slot associated with the final request ending the batch of requests or a second slot preceding an unavailable slot.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
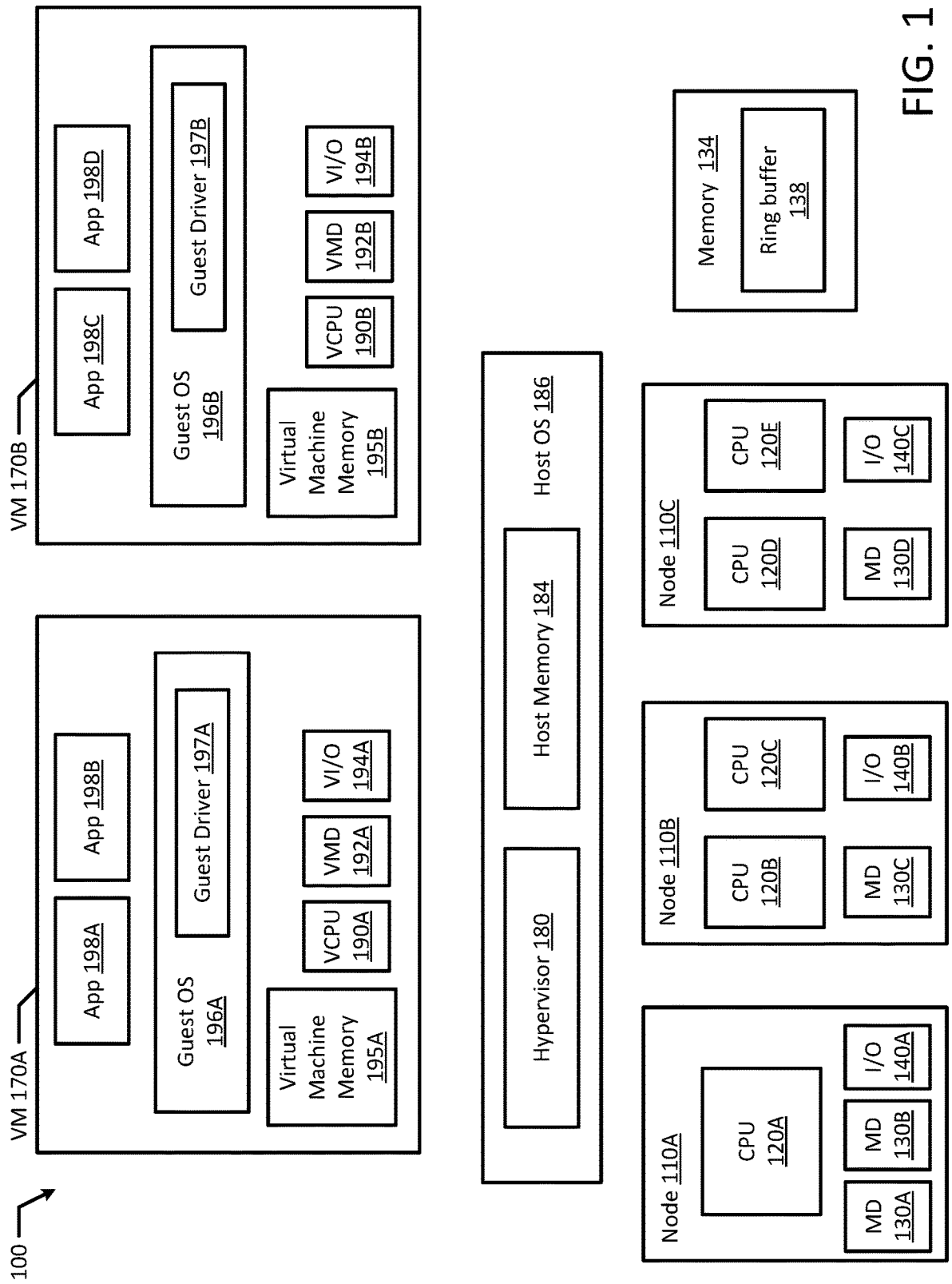
FIG. 1 illustrates a block diagram of an example computing system according to an example embodiment of the present disclosure.

Techniques are disclosed for reverse order request queuing by para-virtual device drivers. Paravirtualization provides a fast and efficient means of communication for guests to use devices on the host machine. Paravirtualized device drivers, which may be referred to as para-virtual device drivers make it possible for the guest operating system access to physical devices on the host system. Reverse order request queueing may be implemented when receiving data and copying data from one memory location (e.g., ring buffer) to a different memory. For example, the techniques disclosed may be used when receiving disk write requests for network traffic. For example, the techniques disclosed may be used when processing or executing disk write requests to transmit network traffic (e.g., network traffic from a cloud computing platform) such as a data packet to or from virtual devices, such as a virtual machine ("VM"). For example, a guest operating system or associated guest driver may receive disk write requests and execute the requests such that a hypervisor can transmit the processed requests (e.g., packets) to/from virtual machines by copying memory entries from a ring buffer and transmitting the memory entries to virtual machine memory. Virtualization may allow a host machine to run multiple virtual environments, for example using a hypervisor (e.g., Kernel-based Virtual Machine ("KVM")) on an operating system, such as Red Hat® Enterprise Linux® ("RHEL"). When handling network traffic (e.g., network traffic from a cloud computing platform such as the Red Hat® OpenStack® Platform), hypervisor vendors and operating system ("OS") vendors often attempt to improve networking speed for hypervisors for use in networking stacks. An example vendor is Red Hat®, which offers RHEL.

Transmitting a packet from a virtual machine typically involves receiving packets or requests (e.g., disk write requests) and executing the requests to write an address of the packets associated with the requests in a queue of a virtual network interface. After the packet is transmitted, a hypervisor notifies a guest operating system ("OS") about the packet transmission. When emulating a virtual NIC ("vNIC"), a descriptor in guest memory may be marked valid for transmission and a hypervisor clears the valid marking to signal completion. The descriptors are typically arranged in a ring structure, one after another. However, when a hypervisor is faster than the guest OS, which may often times be the case, the guest OS may add packets one after another, and as each packet is added, the hypervisor immediately reads the entry and processes the entry. As a result, the same entry is accessed almost simultaneously by both the guest OS and the hypervisor, causing the cache line containing the entry to bounce between the guest OS and the hypervisor (or the CPUs controlled by the guest OS and the hypervisor) and causing poor performance due to cache line contention. This phenomenon is unlike physical devices, which are not typically executed on a CPU and thus do not typically cache data.

After processing the last descriptor in the ring, the guest OS proceeds back to the first descriptor to mark additional packets as valid for transmission. The act of receiving the data (e.g., packets) and copying the data may be executed on the same processor (e.g., central processing unit "CPU"), however, parallelizing the actions on separate processors or separate processor cores may provide significant performance advantages. However, because the parallel process utilizes two CPUs, the process adds additional overhead as adding and removing packets on one list requires cross-CPU communication through shared memory. Traditionally, a linked list or a producer/consumer ring was used without much added performance as false cache sharing typically outweighed the benefits of parallelism. For example, false cache sharing is a performance-degrading usage pattern resulting from periodically accessing data that one of the CPUs (e.g., a first CPU) will not alter (e.g., unaltered data) and the unaltered data shares a cache block or cache line with data that is altered. Because the unaltered data shares a cache block or cache line with altered data, a caching protocol may force the other CPU (e.g., a second CPU) to reload the whole unit of data even though much of the data remains unchanged or unaltered. Thus, the second CPU bears the caching overhead associated with the reload to maintain shared access of the resource (e.g., linked list or a producer/consumer ring). Specifically, if two processors operate on independent data in the same memory address region storable in a single cache line, the entire cache line may have to be refreshed causing memory stalls in addition to wasting system bandwidth.

Additionally, other approaches such as a typical circular buffer design often creates cache line bounces between the two CPUs or CPU cores (e.g., a first CPU or core associated with a hypervisor and a second CPU or core associated with a guest OS). The processor associated with the guest OS may increment a pointer to address the next slot, thereby wrapping around at the end of the array. To avoid overruns, before marking the data (e.g., the address of each packet and/or packet) as valid, the guest OS may test the value in each slot. If the descriptor value is valid, the new data is not stored in the list and may be discarded. The processor associated with a hypervisor, which may be referred to as a data copying processor, may maintain a consumer pointer. The hypervisor may test the value pointed to by the consumer pointer. If the descriptor value has been cleared and is invalid, then the array is empty and the hypervisor may stop and wait for more packet entries marked valid for transmission. If the descriptor value is valid, the hypervisor may retrieve the data, such as a packet address. Then, the hypervisor may clear the valid descriptor and may advance the consumer pointer to the next slot. The retrieved data may be copied to a second memory location (e.g., virtual machine memory).

Clearing a valid descriptor or slot (e.g., overwriting the valid bit or storing a NULL value in a slot) advantageously allows reuse of the slot for additional data (e.g., forwarding a new packet). However, this data structure may experience performance bottlenecks. For example, when transmitting is slower than validating packets for transmission or conversely when validating packets is slower than transmitting. In the first case, the ring may be full for a large part of the time, and as a result, as the hypervisor signals completion of an entry, the entry is immediately made valid again by the interrupt handling processor associated with the guest OS, which causes a cache line to bounce between the processors and results in a significant slowdown. Similarly, when the ring is empty for a large part of the time, as the guest OS makes an entry valid, the entry is immediately accessed by the hypervisor, cleared and signaled as complete. Due to the bottleneck and resulting slowdown, the guest OS and hypervisor may be unable to achieve sufficient separations, resulting in cache line bounces for each data operation in the ring buffer.

A proposed solution to the cache line bounces described above is to load a network interface controller ("NIC") driver in a virtual machine as a pass-through to avoid the need for packet forwarding. However, this approach breaks migration and overcommit, which may cause the host or computer system to crash. Additionally, even though producing or consuming multiple memory entries or packets at once may cause a single invalidation, such batching may require waiting for multiple packets to become available through receive coalescing or rx coalescing, which may increase latency and add overhead for running timers on the host. For example, rx coalescing may wait a predetermined amount of time before raising an rx interrupt after a memory entry or packet has been received. Similarly, rx coalescing may involve waiting for a specified number of memory entries or packets to queue up before raising an rx interrupt. Further, the proposed solution of loading a NIC driver in a virtual machine as a pass-through (e.g., with rx coalescing) may cause delays while waiting for additional packets and may result in additional overhead as a result of using a complex consumer or producer processor Another proposed solution to the cache line bounces described above is to reserve extra slots in the ring, which would remain unused to space out the guest OS and the hypervisor such that they were not accessing the same cache line. However, ring size is often designed in powers of two to allow optimization. If a ring buffer with 128 active slots is needed, then by adding unused slots, the implemented ring would be designed with 256 slots (e.g., next power of two above 128 slots). For example, if 128 active slots will be utilized, and 10 slots will remain unused, then the ring needs a minimum of 138 slots. Due to the common practice of increasing ring buffer size by a factor of two, the next logical ring buffer size is 256 slots (e.g., next largest size up from 128 slots). However, larger rings are problematic because the processors keep watch over the ring, and a larger ring puts more pressure on cache. Moreover, only actively using, for example, 128 slots of 256 slots is not an efficient use of hardware resources.

As described in the various example embodiments disclosed herein, to reduce the frequency of cache line bounces and prevent slowdown, the guest driver is modified to detect that the guest driver or guest OS is running on a virtual device (e.g., by looking at subsystem vendor ID and determining that the device is implemented by a hypervisor). In another example, the guest driver may detect a device type, such as a specific device model number (e.g., a hardware model number). After detecting the hypervisor and/or virtual device, the request and/or packet processing behavior is modified such that, as the guest driver receives a batch of packets, the guest driver walks the ring. At each step, the guest driver verifies that the ring can store a descriptor describing the next write request or packet. For example, the guest driver may test the contents of each slot in the ring. The guest driver stops walking the ring when the ring is detected as full or after the guest driver walks a sufficient number of slots to store the entire batch of write requests or packets. For example, the walk ends when an unavailable (e.g., busy, not consumed slot) slot is identified or after walking an adequate number of slots in order to process the entire batch of requests or store the entire batch of packets.

Unlike physical devices, which perform write requests or save packets without using cache, the guest driver has not yet executed the write request or saved packets in the ring at this point. The guest driver has identified the last write request or packet in the batch that can be accommodated by the ring. For example, a portion of the batch may be stored in the ring if a full ring was encountered. Alternatively, if there are enough empty slots available in the ring, the entire batch may be stored in the ring. The above described modification to the guest driver leaves most of the logic intact such that the guest driver can still work on bare-metal (e.g., a bare-metal hypervisor or a type 1 hypervisor that runs directly on the hardware and that hosts guest operating systems). Furthermore, the modification described herein is optimal for hypervisors while advantageously not breaking the actual physical devices being emulated (e.g., breaking the equivalence between the logical and physical memory).

For software devices or paravirtualized (e.g., para-virtual) devices, cache optimization is typically implicitly handled automatically when a CPU is synched with other CPUs. Due to this implicit or automatic optimization, it may be difficult to prevent situations when a ring is typically full or empty resulting in cache line bounces. However, by modifying the guest driver to execute requests in batches and write packet addresses to the ring in reverse order, the system is forced to batch requests and thereby advantageously reduces the frequency of cache line bouncing and improves performance. Conversely, if batches were written in ring order (instead of reverse order), then cache line bounces may remain a problem.

After identifying the last free descriptor in the ring and the last request or packet, the guest driver starts walking the ring and batch of requests or packets backwards and at each successive slot a packet in the batch is stored in the ring. For example, at each step, the request is processed or the packet is stored in the ring and the descriptor is marked valid. In an example, the batch of packets is walked such that the order of packets in the ring is the same as the order of packets in the batch. At the end of the walk, the order of the packets in the ring is the same as the order of packets in the batch. Due to processing write requests or producing memory entries (e.g., packets) in groups or batches, the hypervisor is held back and starts consuming entries (e.g., clearing valid descriptors) in the ring after the guest driver has made progress. The guest driver may advantageously process requests (e.g., produce or store a batch of packets) elsewhere in the ring (e.g., a few slots ahead of the hypervisor) such that multiple requests are processed (e.g., packets are produced in the ring) before the cache line bounces between the guest driver and hypervisor, even when the ring is empty or almost empty. Thus, the hypervisor processes packets (e.g., clears valid descriptors) in the ring after multiple requests have been processed (e.g., packets written to the ring), and especially for large batch sizes the guest driver spends most of the time processing requests (e.g., writing out packets) into cache lines not accessed by the hypervisor, which reduces the number of cache line bounces significantly and improves performance. For example, the above guest driver modification may improve packet throughput by approximately ten percent or more.

Instead of the cache line constantly bouncing between the guest driver and hypervisor, the guest driver processes a batch of requests (e.g., produces a batch of memory entries) at a time, which advantageously allows the guest driver to produce or store multiple memory entries before the cache line bounces to the hypervisor, thereby improving performance and throughput without doubling the ring size as described above.

FIG. 1 depicts a high-level component diagram of an example computing system 100 in accordance with one or more aspects of the present disclosure. The computing system 100 may include an operating system (e.g., host OS 186), one or more virtual machines (VM 170A-B), nodes (e.g., nodes 110A-C), and memory 134 including a ring buffer 138. Ring buffer 138 may be a data structure using a single, fixed-size buffer as if it were connected end-to-end (e.g., in a ring). In an example, the ring buffer 138 may be a first-in-first-out (FIFO) data structure. For example, memory entries such as packet addresses may be written into and retrieved from the ring buffer 138. Additionally, the ring buffer 138 may have a plurality of slots, which may store memory entries. The slots may be tracked by pointers or indices. Each memory entry may be associated with a descriptor, which may be marked as valid and may later be cleared or invalidated. A descriptor may be a bit, a field entry, an address, a packet length, etc. Similarly, a valid descriptor may be a valid bit, a special value in the field entry, a non-zero address, a non-zero packet length, etc.

Virtual machines 170A-B may include a guest OS, guest memory, a virtual CPU (VCPU), virtual memory devices (VMD), and virtual input/output devices (VI/O). For example, virtual machine 170A may include guest OS 196A and associated guest driver 197A, guest memory or virtual machine memory 195A, a virtual CPU 190A, a virtual memory devices 192A, and virtual input/output device 194A. Virtual machine memory 195A may include one or more memory pages. Similarly, virtual machine 170B may include guest OS 196B and associated guest driver 197B, virtual machine memory 195B, a virtual CPU 190B, a virtual memory devices 192B, and virtual input/output device 194B. Virtual machine memory 195B may include one or more memory pages.

The guest driver(s) 197A-B may be configured to receive a batch of requests (e.g., disk write requests) or memory entries and process the requests or store the batch of memory entries in the ring buffer 138 by walking the ring buffer 138 and testing respective slots. For example, the guest driver(s) 197A-B may walk the ring buffer 138 starting at an original slot, such as a slot indicated by a current pointer. As the guest driver(s) 197A-B walks the ring buffer 138, the guest driver(s) 197A-B is configured to test respective values associated with memory entries in each slot to identify the last request or memory entry in the batch that can be processed or stored in the ring buffer 138 (e.g., either part of the batch if a busy or unconsumed slot was encountered or the last memory entry in the batch). For example, the end slot may be associated with the final request or memory entry ending the batch of memory entries or a slot preceding an unavailable slot (e.g., unconsumed slot that still has a valid descriptor). Additionally, the testing may be conducted while the contents of each slot remain unchanged.

Then, after identifying the last request that can be accommodated by the ring buffer 138 (e.g., memory entry that can be stored in the ring buffer 138), the guest driver(s) 197A-B is configured to process or execute requests (e.g., produce memory entries to the ring buffer 138) from the initial request (e.g., write request associated with a memory entry) in the batch to the last identified request (e.g., write request associated with a memory entry). The guest driver(s) 197A-B may process or execute requests (e.g., store or produce memory entries to the ring buffer 138) by walking the ring buffer 138 backwards and executing write requests (e.g., storing the memory entries) in the previously tested ring buffer 138 slots that were available (e.g., empty or consumed such that the valid descriptor is cleared). An empty or previously consumed slot may include an invalid value, such as a memory entry in the slot with a "0" value. By executing or processing requests (e.g., producing memory entries) in batches, the guest driver(s) 197A-B prevents cache line bounces after each memory entry production, thereby improving performance and throughput.

The guest drivers 197A-B may be paravirtualized or para-virtual device drivers. Paravirtualization provides a fast and efficient means of communication for guests to use devices on the host machine. Paravirtualized device drivers make it possible for the guest operating system access to physical devices on the host system.

The computing system 100 may also include a hypervisor 180 and host memory 194. The hypervisor 180 may clear a valid descriptor by overwriting a valid bit with an invalid bit, deleting a special entry in a valid field, overwriting a packet address with an invalid value (e.g., a zero value or NULL value), changing a packet length to an invalid packet length, etc. Additionally, hypervisor 180 may manage host memory 184 for the host operating system 186 as well as memory allocated to the virtual machines 170A-B and guest operating systems 196A-B such as guest memory or virtual machine memory 195A-B provided to guest OS 196A-B. Host memory 184 and virtual machine memory 195A-B may be divided into a plurality of memory pages that are managed by the hypervisor 180. Virtual machine memory 195A-B allocated to the guest OS 196A-B may be mapped from host memory 184 such that when a guest application 198A-D uses or accesses a memory page of virtual machine memory 195A-B, the guest application 198A-D is actually using or accessing host memory 184.

In an example, a virtual machine 170A may execute a guest operating system 196A and run applications 198A-B which may utilize the underlying VCPU 190A, VMD 192A, and VI/O device 194A. One or more applications 198A-B may be running on a virtual machine 170A under the respective guest operating system 196A. A virtual machine (e.g., VM 170A-B, as illustrated in FIG. 1) may run on any type of dependent, independent, compatible, and/or incompatible applications on the underlying hardware and OS. In an example, applications (e.g., App 198A-B) run on a virtual machine 170A may be dependent on the underlying hardware and/or OS 186. In another example embodiment, applications 198A-B run on a virtual machine 170A may be independent of the underlying hardware and/or OS 186. For example, applications 198A-B run on a first virtual machine 170A may be dependent on the underlying hardware and/or OS 186 while applications (e.g., application 198C-D) run on a second virtual machine (e.g., VM 170B) are independent of the underlying hardware and/or OS 186A. Additionally, applications 198A-B run on a virtual machine 170A may be compatible with the underlying hardware and/or OS 186. In an example embodiment, applications 198A-B run on a virtual machine 170A may be incompatible with the underlying hardware and/or OS 186. For example, applications 198A-B run on one virtual machine 170A may be compatible with the underlying hardware and/or OS 186A while applications 198C-D run on another virtual machine 170B are incompatible with the underlying hardware and/or OS 186. In an example embodiment, a device may be implemented as a virtual machine (e.g., virtual machine 170A-B).

The computer system 100 may include one or more nodes 110A-C. Each node 110A-C may in turn include one or more physical processors (e.g., CPU 120A-E) communicatively coupled to memory devices (e.g., MD 130A-D) and input/output devices (e.g., I/O 140A-C). Each node 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. Virtual machines 170A-B may be provisioned on the same host or node (e.g., node 110A) or different nodes. For example, VM 170A and VM 170B may both be provisioned on node 110A. Alternatively, VM 170A may be provided on node 110A while VM 170B is provisioned on node 110B.

In an example, ring buffer 138 may be stored in a memory device, and may be one of the other memory(s) illustrated in FIG. 1, such as MD 130A-D on node 110A-C.

The processor associated with the guest OS (e.g., guest OS 196A-B, hereinafter referred to generally as guest OS 196) or guest driver (e.g., guest driver 197A-B, hereinafter referred to generally as guest driver 197) may be configured to execute requests (e.g., disk write requests) and mark memory entries such as packet addresses valid for transmission. The guest OS 196, guest driver 197 and/or associated processor may also be configured to send a request associated with a memory entry to the hypervisor 180. The hypervisor 180 may be configured to retrieve memory entries from the ring buffer 138 by testing descriptor values of associated with the memory entries to determine whether the slots contain memory entries with valid descriptors (e.g., memory entries marked as valid or ready for transmission). The hypervisor 180 may also be configured to transmit a memory entry or copying the memory entry. Additionally, the hypervisor 180 may be configured to clear valid descriptors after retrieving memory entries from slots in the ring buffer.

It should be appreciated that when discussing the capabilities of the guest OS 196 that the guest OS 196, guest driver 197 or the processor associated with the guest OS 196 or guest driver 197 may be responsible for a specific act or action. Similarly, when discussing the capabilities of the hypervisor 180, the hypervisor 180 may be responsible for a specific act or action or the processor associated with the hypervisor 180 may be responsible for the specific act or action. Additionally, it should be appreciated that when referring to a CPU or core associated with the hypervisor 180, the CPU may be a virtual CPU ("vCPU"). Similarly, when referring to a CPU or core associated with the guest OS 196A-B or guest driver 197A-B, the CPU may be a vCPU. For example, a ring data structure (e.g., an array with a plurality of slots) may be used with a guest OS 196A-B and a hypervisor 180.

As used herein, physical processor or processor 120A-C refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-C refers to a volatile or non-volatile memory device, such as random access memory (RAM), read-only memory (ROM), electrically erasable programmable read-only memory (EEPROM), or any other device capable of storing data. As discussed herein, I/O device 140A-C refers to a device capable of providing an interface between one or more processor pins and an external device capable of inputting and/or outputting binary data.

Processors 120A-C may be interconnected using a variety of techniques, ranging from a point-to-point processor interconnect, to a system area network, such as an Ethernet-based network. Local connections within each node, including the connections between a processor 120A-C and a memory device 130A-C may be provided by one or more local buses of suitable architecture, for example, peripheral component interconnect (PCI).

Figure 2A:
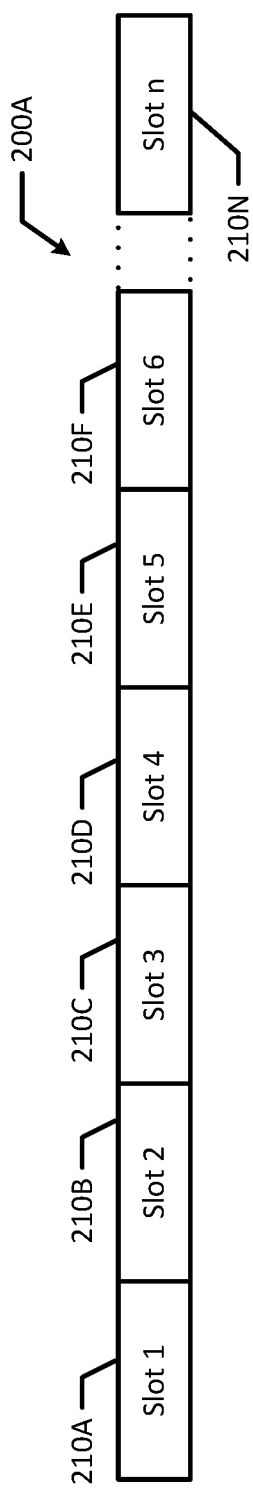
FIG. 2A illustrates a block diagram of an example memory ring according to an example embodiment of the present disclosure.
Figure 2B:
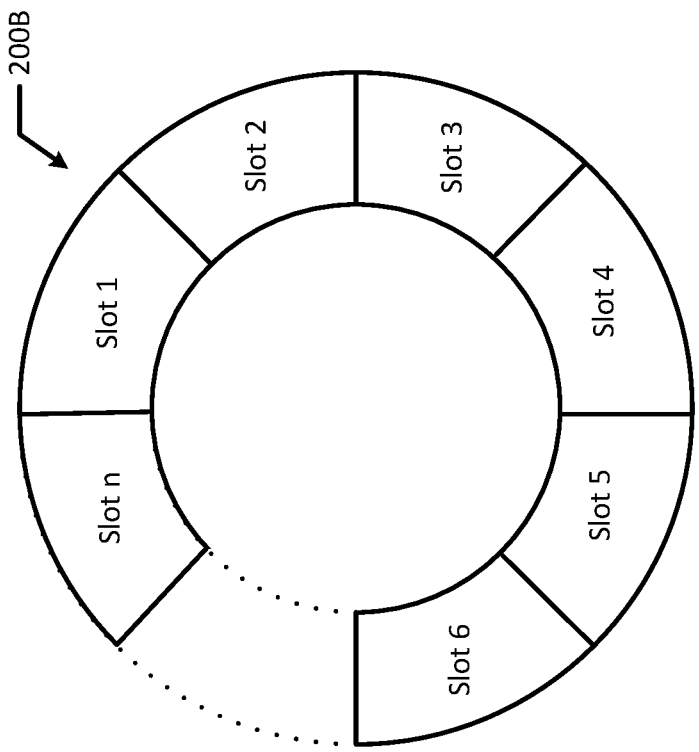
FIG. 2B illustrates a block diagram of an example memory ring according to an example embodiment of the present disclosure.

FIGS. 2A and 2B illustrate block diagrams of example ring buffers 200A and 200B. For example, FIG. 2A illustrates a linear buffer implementation of ring buffer 200A while FIG. 2B illustrates the "ring" structure of ring buffer 200B. It should be appreciated that ring buffers 200A-B may be the same actual memory structure illustrated in two different ways. Ring buffers 200A-B may in be located in cacheable memory, such as L1 cache if on the same physical processor but on different CPU cores. In another example, the ring buffer 200A-B may be on a different level of cache other than L1. Additionally, ring buffers 200A-B may include a plurality of slots (e.g., slots 210A-N). For example, slots 210A-N may correspond to Slot_1 to Slot_n respectively. Each slot may include a memory entry, such as a data packet, a packet address, or the like. Additionally, slots may be empty or may include an invalid value, such as "0". For example, a slot with a memory address of "0" may be used to indicate an empty slot or invalid slot. Valid slots may include a memory entry, such as a data packet or a packet address.

Additionally, each slot or entry may be associated with a descriptor or descriptor value. Slots may be empty or may include a cleared to invalid descriptor value, such as "0". For example, a slot with a memory address of "0" may be used to indicate an entry with a cleared descriptor. Slots with a valid descriptor value may include a memory entry with a non-zero address or non-zero packet length, such as an entry pointer to a data packet or a packet address. Additionally, a valid descriptor may be a valid bit or a special value in a field entry associated with the memory entry.

Figure 3:
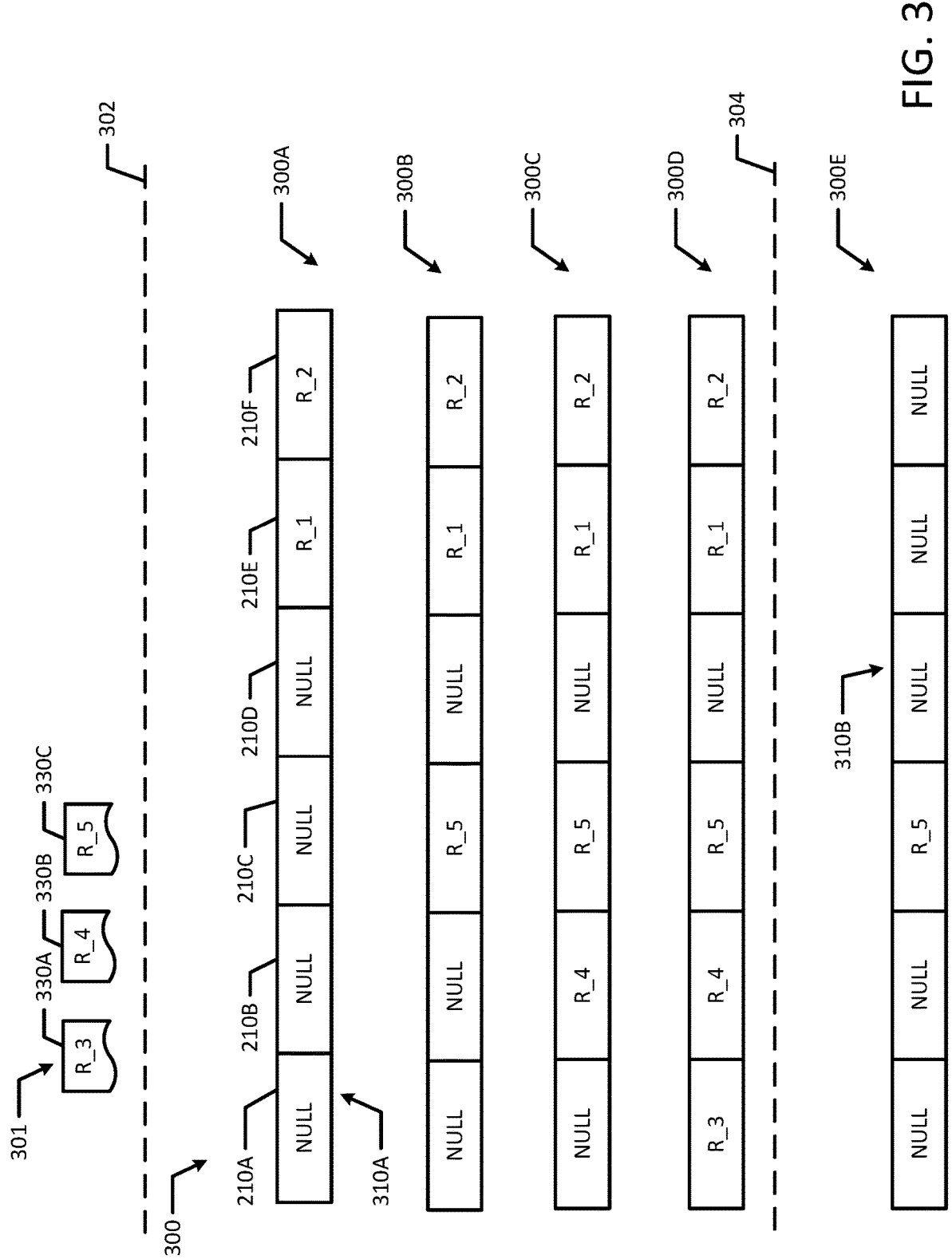
FIG. 3 illustrates a block diagram of reverse order requesting queueing of an example memory ring.

FIG. 3 illustrates a block diagram of reverse order requesting queueing of an example memory ring, such as ring buffer 138 or 200A-B. For example, memory ring 300 is illustrated as 300A-E, which represents different states of memory ring 300 at different points in time. Memory ring or ring buffer 300 may include six slots (e.g., slots 210A-F). In an example, each slot may include a memory entry associated with a request R_1 to R_5 or an invalid value, such as a NULL value. The requests may be disk write requests to write packet addresses, such as a packet address P_1 to P_5 or descriptors D_1 to D_5. As illustrated in ring buffer 300A, slot 210A includes a NULL value, slot 210B includes a NULL value, slot 210C includes a NULL value, slot 210D includes a NULL value, slot 210E includes a memory entry associated with request R_1 (e.g., packet address P_1), and slot 210F includes a memory entry associated with request R_2 (e.g., packet address P_2). Disk write requests may be processed or executed and memory entries (e.g., packet addresses) may be written into the memory ring or ring buffer 300 by a guest driver, such as guest driver(s) 197A-B. Additionally, indices or pointers may indicate specific slots in ring buffer 300.

For example, a pointer may designate or indicate an original slot (e.g., slot 210A). The pointer may be advanced to successive slots as the guest driver(s) 197A-B tests and/or produces packets to slots. In an example, the pointer may be an index, such as a registry. Additionally, the pointer may be maintained in a cache line. A batch 301 of requests (e.g., requests 330A-C), such as disk write requests associated packets may be received by guest driver(s) 197A-B. After the batch 301 of requests 330A-C is received, the guest driver(s) 197A-B may start processing the batch 301 of requests at a later time 302. For example, as illustrated by ring buffer 300A, the guest driver(s) 197A-B may walk the ring buffer 300A starting from an original slot 310A (e.g., slot 210A), which may be indicated by a pointer, to identify the last available or free slot and the last request from the batch 301 of requests (e.g., requests 330A-C) that can be accommodated by the ring buffer 300A by testing each slot and respective memory entry. In the illustrated example, the batch 301 of requests includes three requests 330A-C (e.g., disk write request associated with memory entries or packets) and there are three successive available or free slots (e.g., empty slots) extending from the original slot 310A (e.g., slot 210A) to slot 210C.

After determining that each request (e.g., requests 330A-C) can be accommodated by the ring buffer 300, the guest driver(s) 197A-B may walk the ring backwards and process the batch 301 of requests (e.g., requests 330A-C) and write or produce the associated memory entries to the ring buffer 300. For example, as illustrated by ring buffers 300B-D, the guest driver(s) 197A-B successively processes requests R_5 to R_3 (e.g., by stores packet addresses P_5 to P_3 associated with requests R_5 to R_3) in slots 210C to 210A respectively.

After requests are processed or executed (e.g., memory entries are produced to the ring buffer 300D), the memory entries associated with the requests (e.g., requests R_1 to R_5) may be consumed by hypervisor 180. For example, after some time 304, the hypervisor 180 may retrieve memory entries and clear valid descriptors associated with requests R_1 to R_4 from slots 210E, 210F, 210A, and 210B. After retrieving the memory entries associated with requests R_1 to R_4, the hypervisor 180 may invalidate the group of slots (e.g., slots 210E-F), as illustrated by ring buffer 300E.

The guest driver(s) 197A-B may proceed processing additional requests (e.g., producing additional memory entries, such as packet addresses or data packets), from additional batches 301 of received requests. Once the guest driver(s) 197A-B has produced additional memory entries in the available (e.g., empty or invalidated) slots, the hypervisor 180 may once again retrieve and copy those additional memory entries to a second memory, such as a VM memory 195A. For example, the hypervisor 180 may retrieve and copy memory entries associated with requests R_3 and R_4 from slots 210A and 210B respectively after the guest driver(s) 197A-B is done accessing the cache line for slots 210A and 210B, which advantageously reduces the frequency of cache line bounces between the guest driver(s) 197A-B and hypervisor 180. For example, the guest driver(s) 197A-B processes or executes multiple requests (e.g., produces multiple memory entries) in batches 301, thereby holding back the hypervisor 180 and advantageously preventing the frequency of cache line bounces without increasing ring size of ring buffer 138. In an example, memory entries in the second memory, such as VM memory 195A may later be stored in a different ring buffer 138.

As illustrated in FIG. 3, the batch of requests includes three requests (e.g., requests 330A-C), however, batches 301 of different sizes and quantities may be used. For example, the batch 301 may include two, three, four, ten, etc. requests. In an example, the batch 301 size and/or quantity may be associated with the size of the ring buffer 138. For example, the batch 301 size and/or quantity may be a fraction of the size of the ring buffer 138 (e.g., 1/16 of a ring, 1/8 of a ring, or 1/4 of a ring). In an example, if the batch 301 size and/or quantity is 1/16 of a ring with 128 slots, then the batch 301 size and/or quantity may be 8 memory entries correlating to 8 slots. Similarly, the batch 301 size and/or quantity may also be related to the quantity of cache lines used by the ring buffer 138. For example, if the ring buffer 138 uses four cache lines (e.g., 32 slot ring where each slot is 8 bytes and four cache lines of 64 bytes), then the batch 301 size and/or quantity may be the quantity of requests that are accommodated by slots in a single cache line (e.g., 8 slots). For example, the batch size 301 may be the quantity disk write requests for memory entries that are stored in slots dedicated to a single cache line (e.g., 8 slots), which may advantageously prevent cache line bounces between the guest driver(s) 197A-B and the hypervisor 180 because the guest driver(s) 197A-B and hypervisor 180 (or each processor associated with the guest driver(s) 197A-B and hypervisor 180) may be accessing different cache lines. For example, after the guest driver(s) 197A-B processes or executes requests (e.g., produces memory entries) in slots in a first cache line, it may start processing or executing requests (e.g., producing additional memory entries) in a different cache line (e.g., second cache line) as the hypervisor 180 is consuming memory entries or slots in the first cache line, thereby allowing the guest driver(s) 197A-B and the hypervisor 180 to simultaneously execute memory operations in separate cache lines.

Figure 4A:
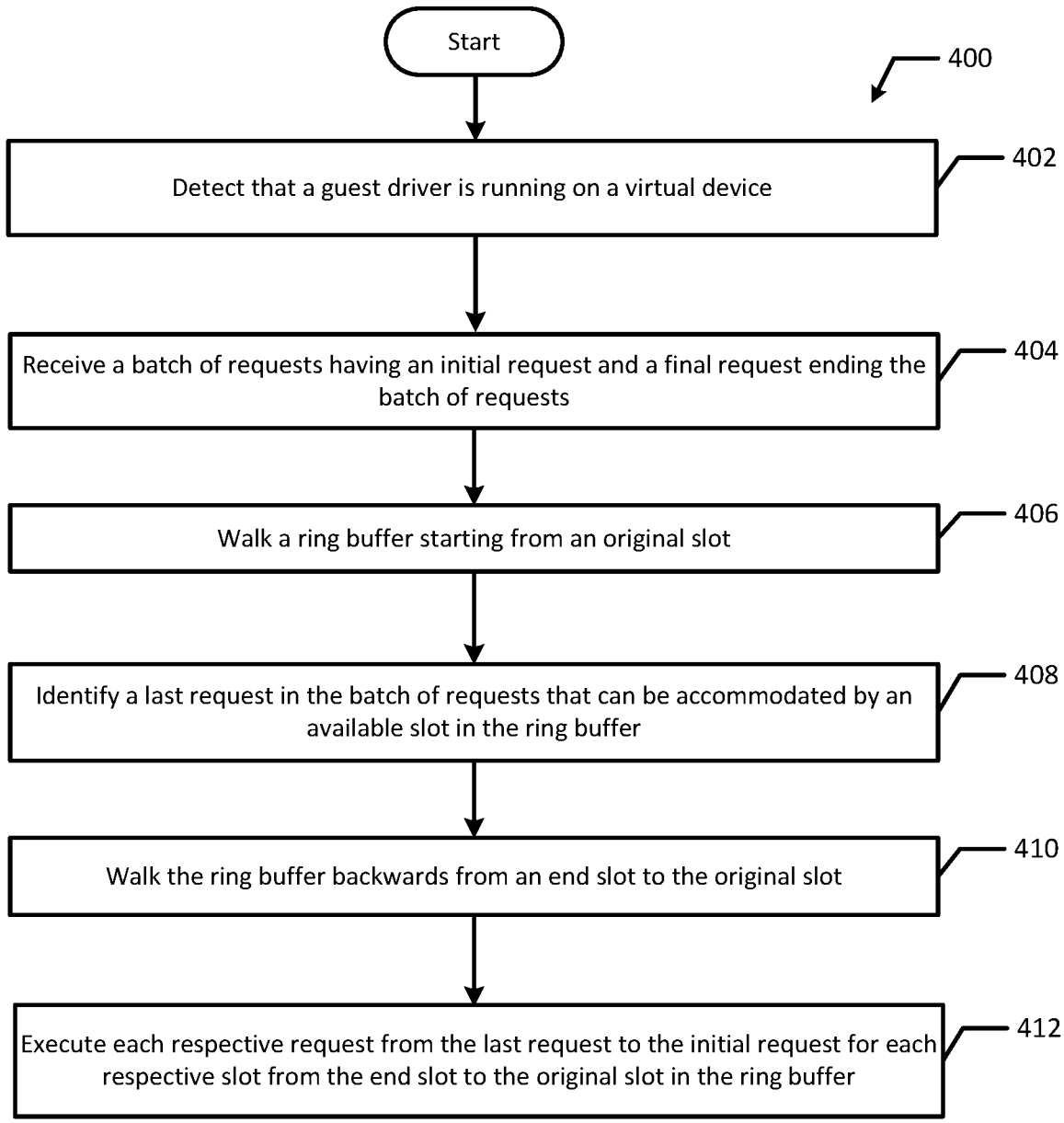
FIG. 4A illustrates a flowchart of an example process for reverse order request queueing by para-virtual device drivers according to an example embodiment of the present disclosure.

FIG. 4A illustrates a flowchart of an example method 400 for reverse order request queueing by para-virtual device drivers according to an example embodiment of the present disclosure. Although the example method 400 is described with reference to the flowchart illustrated in FIG. 4A, it will be appreciated that many other methods of performing the acts associated with the method 400 may be used. For example, the order of some of the blocks may be changed, certain blocks may be combined with other blocks, one or more blocks may be repeated, and some of the blocks described are optional. The method 400 may be performed by processing logic that may comprise hardware (circuitry, dedicated logic, etc.), software, or a combination of both.

The example method 400 includes detecting that a guest driver is running on a virtual device (block 402). The guest OS 196A may make such a determination via guest driver 197A, for example, by reviewing subsystem vendor ID and determining that the device is implemented by a hypervisor. The vendor ID may match a hypervisor vendor and a subsystem ID may identify which vendor (e.g., Red Hat®) provided the device. In another example, a system ID may match a hypervisor vendor and may be used to find a specific driver (e.g., a Red Hat® driver may search for a Red Hat® vendor ID). Then, the guest driver receives a batch of requests having a first request and a final request ending the batch of requests (block 404). For example, a guest driver(s) 197A-B may receive a batch 301 of requests (e.g., three disk write requests) having an initial request (e.g., request 330A) and a final request (e.g., request 330C), which ends the batch of requests (e.g., the last request in the batch 301). In an example, the batch 301 of requests may include two or more requests, which may be disk write requests associated with memory entries or data packets. Then, the guest driver may walk a ring buffer starting from an original slot (block 406). For example, the guest driver(s) 197A-B may walk the ring buffer 138 forward starting from an original slot 310A toward a slot associated with the final request until identifying an end slot. In an example, the guest driver(s) 197A-B may execute a walk function to walk the ring buffer 138.

In an example, the guest driver(s) 197A-B may test a respective value associated with a respective memory entry of each slot in the ring buffer from the original slot toward a slot associated with the final request until identifying an end slot. The guest driver(s) 197A-B may test respective values (e.g., NULL) associated with respective memory entries of each slot in the ring buffer from the original slot toward a slot associated with the final request until identifying the end slot. The end slot may be a slot associated with the final memory entry (e.g., request 330C) ending the batch 301 of requests, for example, two slots after the original slot 310A if the batch 301 includes three requests. Alternatively, the end slot may be a slot preceding an unavailable slot (e.g., a slot storing a memory entry associated with a request from a previous batch 301 of requests) located between the original slot and the slot associated with the second (e.g., last) request in the batch 301.

If there are less available slots than requests in the batch 301 of requests, the guest driver(s) 197A-B may walk to and test a slot after the slot identified as the end slot. For example, with a batch of five requests with an original slot 310A (e.g., slot 210A), the slot associated with the fifth memory entry (e.g., slot 210E) is an unavailable slot or unconsumed slot because it includes a value (e.g., value associated with R_1). Thus, as illustrated in ring buffer 300A with a batch of five or more requests, the end slot would be 210D, which is the last available slot (e.g., empty slot) behind or immediately preceding the unavailable or unconsumed slot 210E. In an example, the guest driver(s) 197A-B may perform testing while the contents of each tested slot remain unchanged. For example, the guest driver(s) 197A-B may test slots without processing or executing requests (e.g., storing or producing memory entries) to the slots, which advantageously prevents the hypervisor 180 from prematurely consuming memory entries from the ring buffer 138. An unavailable slot is a slot with a valid value that has yet to be consumed and cleared by the hypervisor 180. An unavailable slot may be an unconsumed slot that is non-empty and has a non-NULL value. On the other hand, an available slot is a slot with an invalid value. An available slot may be a consumed slot that is empty and has a NULL value after the valid descriptor has been cleared.

The guest driver may identify a last request in the batch of requests that can be accommodated an available slot in the ring buffer (block 408). For example, the guest driver(s) 197A-B may identify a last request in the batch of requests that can be accommodated by (e.g., be stored in) an available slot (e.g., a previously consumed slot including an invalid or NULL value) in the ring buffer 138. In an example, the guest driver(s) 197A-B may identify the last request by testing slots as described above. In a batch 301 of three requests, the last request will be either the third request or a preceding request if there is a sufficient quantity of available or empty slots (e.g., NULL valued slots) for each of the requests. If there are not enough successive available or empty slots to accommodate each request in the batch 301, then the last request will be either the starting request of the batch 301 or an intermediate request of the batch 301 depending on the quantity of available empty slots. Then, the guest driver may walk the ring buffer backwards from an end slot to the original slot (block 410). For example, after identifying the end slot (e.g., slot 210C) and the last request (e.g., request R_5 associated with packet P_5), the guest driver(s) 197A-B may walk the ring buffer 138 backwards from the end slot (e.g., slot 210C) associated with the last request (e.g., request R_5 associated with packet P_5) to the original slot 310A. The end slot may be an available slot (e.g., NULL value) associated with the final request ending the batch of requests or a slot preceding an unavailable slot.

Additionally, the guest driver may execute each respective request from the last request to the initial request for each respective slot from the end slot to the original slot in the ring buffer (block 412). For example, the guest driver(s) 197A-B may execute or process each respective request (e.g., requests 330A-C associated with packet address values P_3 to P_5) from the last request (e.g., request R_5 associated with packet P_5) to the initial request (e.g., request R_3 associated with packet P_3) for each respective slot (e.g., slots 210A-C) from the end slot to the original slot 310A in the ring buffer 138. In an example, the guest driver(s) 197A-B may execute requests and store memory entries in the respective slots, such that the requests are processed and the memory entries are stored in the ring buffer 138 in the same order they appear in the batch 301 of requests. For example, if the batch 301 of requests includes three requests (e.g., requests R_1 to R_3 associated with packets P_1 to P_3), but there are only two available empty slots, the guest driver(s) 197A-B may process requests R_2 and R_1 to store packets P_2 and P_1 while walking backwards to maintain the order of the data packets associated with the requests from batch 301. Additionally, memory entries associated with the requests may be stored in the ring buffer 138 in reverse order, random order, etc. depending on the application.

If the batch 301 of requests includes three requests, then the guest driver(s) 197A-B may process or execute up to three requests (e.g., produce or store up to three memory entries) for respective slots in the ring buffer 138. If some of the slots are unavailable (e.g., include a valid value such as a non-NULL value), the guest driver(s) 197A-B may process or execute less than three requests (e.g., store less than three memory entries) from batch 301 for respective slots in the ring buffer 138 (at least until additional slots are consumed by the hypervisor 180). For example, the guest driver(s) 197A-B may advantageously process or execute less than the entire batch 301 of requests to increase efficiency and reduce downtime associated with waiting for additional slots to be invalidated by the hypervisor 180, which may cause undue delays when there is a slowdown in copying and removing memory entries from the ring buffer 138. In an example, the guest driver(s) 197A-B may be paused or may wait before attempting to process or execute additional requests (e.g., produce additional memory entries). Specifically, the guest driver(s) 197A-B may go to sleep before being woken up later to process additional requests. After testing a slot and determining the slot is unavailable, for example, by receiving or reading a valid value (e.g., non-NULL value), a timer may start and count up to a predetermined timespan (e.g., 25 milliseconds, one second, 20 seconds) before the guest driver(s) 197A-B attempts to process additional requests. In another example, the guest driver(s) 197A-B may pause after testing a slot with a valid or non-NULL value (e.g., an unconsumed or busy slot) until it receives an additional batch 301 of requests.

After the guest driver(s) 197A-B executes the requests and stores the respective memory entries, the hypervisor 180 may retrieve, copy, and/or invalidate memory entries in the ring buffer 138. For example, the hypervisor 180 may invalidate each consumed slot by overwriting the slot with a NULL value, such as a "0" address value.

By executing each request in the batch 201 all together instead of one at a time (e.g., one-by-one), the hypervisor 180 is advantageously held back from accessing the ring buffer 138 (e.g., cache line associated with slot in the ring buffer 138), which reduces the frequency and/or occurrence of a cache line bounce. For example, depending on the batch 301 size used and the ring size of ring buffer 138, the guest driver(s) 197A-B and hypervisor 180 may be accessing slots that are far enough away from each other (e.g., in different cache lines) that neither is accessing the same cache line at the same time. For example, a cache line may be 64 bytes, and a slot may be 8 bytes, thus a ring buffer 138 may take up multiple cache lines. If the guest driver(s) 197A-B and the hypervisor 180 are producing and consuming memory entries in slots that are positioned more than 8 slots away from each other in the above example, the guest driver(s) 197A-B and the hypervisor 180 may be utilizing different cache lines. Accordingly, in this example, the batch 301 size or quantity may be 8 or more requests associated with 8 or more memory entries (e.g., with one memory entry per slot) so the respective cache lines used by the guest driver(s) 197A-B and the hypervisor 180 may not overlap thereby avoiding or minimizing cache line bounces.

After a request is processed and a memory entry is produced to the original slot, a cache line may bounce between the guest driver(s) 197A-B and the hypervisor 180. For example, while the guest driver(s) 197A-B is accessing the ring buffer 138, the guest driver(s) 197A-B may access the cache line for the ring buffer 138. However, when the hypervisor 180 needs to access the memory for the ring buffer 138, the hypervisor 180 may request access to the cache line to determine the current state of the ring buffer 138 (e.g., what memory entries are present in the ring buffer 138), thereby causing a cache line bounce which may slow down the process of processing requests (e.g., storing and/or forwarding network traffic such as data packets). In an example, a cache line may be 64 bytes wide. When either the hypervisor 180 or guest driver(s) 197A-B needs to read or write a location in the ring buffer 138, the hypervisor 180 and/or guest driver(s) 197A-B may check for a corresponding entry in the cache. For example, the cache may check for the contents of the requested memory location (e.g., ring slot) in any cache lines that may contain the address.

Figure 4B:
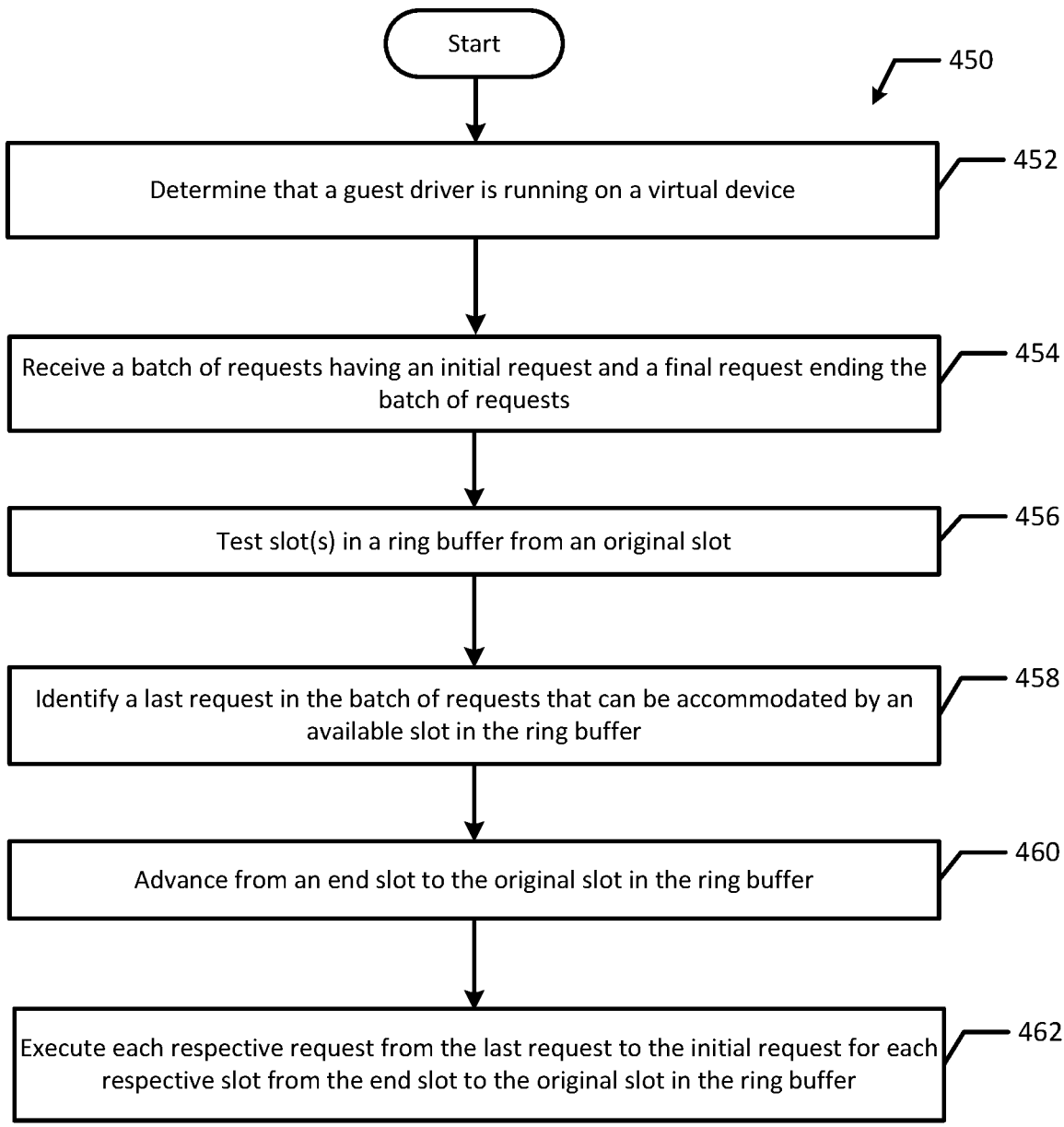
FIG. 4B illustrates a flowchart of an example process for reverse order request queueing by para-virtual device drivers according to an example embodiment of the present disclosure.

FIG. 4B illustrates a flowchart of an example method 450 for reverse order request queueing by para-virtual device drivers according to an example embodiment of the present disclosure. Although the example method 450 is described with reference to the flowchart illustrated in FIG. 4B, it will be appreciated that many other methods of performing the acts associated with the method 450 may be used. For example, the order of some of the blocks may be changed, certain blocks may be combined with other blocks, one or more blocks may be repeated, and some of the blocks described are optional. The method 450 may be performed by processing logic that may comprise hardware (circuitry, dedicated logic, etc.), software, or a combination of both.

The example method 450 includes determining that a guest driver is running on a virtual device (block 452). For example, guest OS 196A may determine that a guest driver is running on a virtual device. The guest OS 196A may make such a determination via guest driver 197A, for example, by reviewing subsystem vendor ID and determining that the device is implemented by a hypervisor. The vendor ID may match a hypervisor vendor and a subsystem ID may identify which vendor (e.g., Red Hat®) provided the device. The guest OS 196A (or guest driver 197A) may determine that the vendor (e.g., Red Hat®) is a software vendor instead of a hardware vendor (e.g., Intel® for a NIC or Cisco Systems for a router or switch) and determine that the guest driver 197A is running on a virtual device based on this information. Then, the guest OS receives a batch of requests having a first request and a final request ending the batch of requests (block 454). For example guest OS 196A may receive a batch 301 of requests, which it may forward to guest driver 197A for processing. Then, the guest OS may test one or more slots in a ring buffer starting at an original slot (block 456). For example, guest OS 196A may test slots in a ring buffer 138 starting from an original slot to determine whether the entire batch 301 of requests can be processed.

The guest OS may identify a last request in the batch of requests that can be accommodated an available slot in the ring buffer (block 458). The guest OS 196A, which may test slots via guest driver 197A, may walk the ring buffer 138 forward from an original slot and test slots until successfully locating an adequate amount of successive slots to accommodate the entire batch 301 of requests or locating the last available successive slot that may be used for a portion of the batch 301 of requests. Then, the guest OS may advance from an end slot to the original slot (block 450). For example, guest OS 196A (or guest driver 197A) may advance from an end slot associated with the last request to the original slot in the ring buffer 138. The ends slot may be either a slot associated with the final request ending the batch of requests or a slot preceding an unavailable slot. The guest OS 196A (or guest driver 197A) may advance in an opposite direction (e.g., backwards) than the testing direction (e.g., forwards) along the ring buffer 138.

Additionally, the guest OS may execute each respective request from the last request to the initial request for each respective slot from the end slot to the original slot in the ring buffer (block 462). For example, the guest OS 196A may execute each respective request (e.g., process or execute disk write requests to store a memory entry into a slot) from the last request to the initial request. The guest OS 196A may execute requests via guest driver 197A. In an example, the guest OS 196A (or guest driver 197A) may execute requests while advancing from the end slot to the original slot.

By executing each request in the batch 201 in reverse order (e.g., so that they appear to be executed all together) instead of one at a time (e.g., one-by-one), the hypervisor 180 is advantageously held back from accessing the ring buffer 138 (e.g., cache line associated with slot in the ring buffer 138), which reduces the frequency and/or occurrence of a cache line bounce.

Figure 5A:
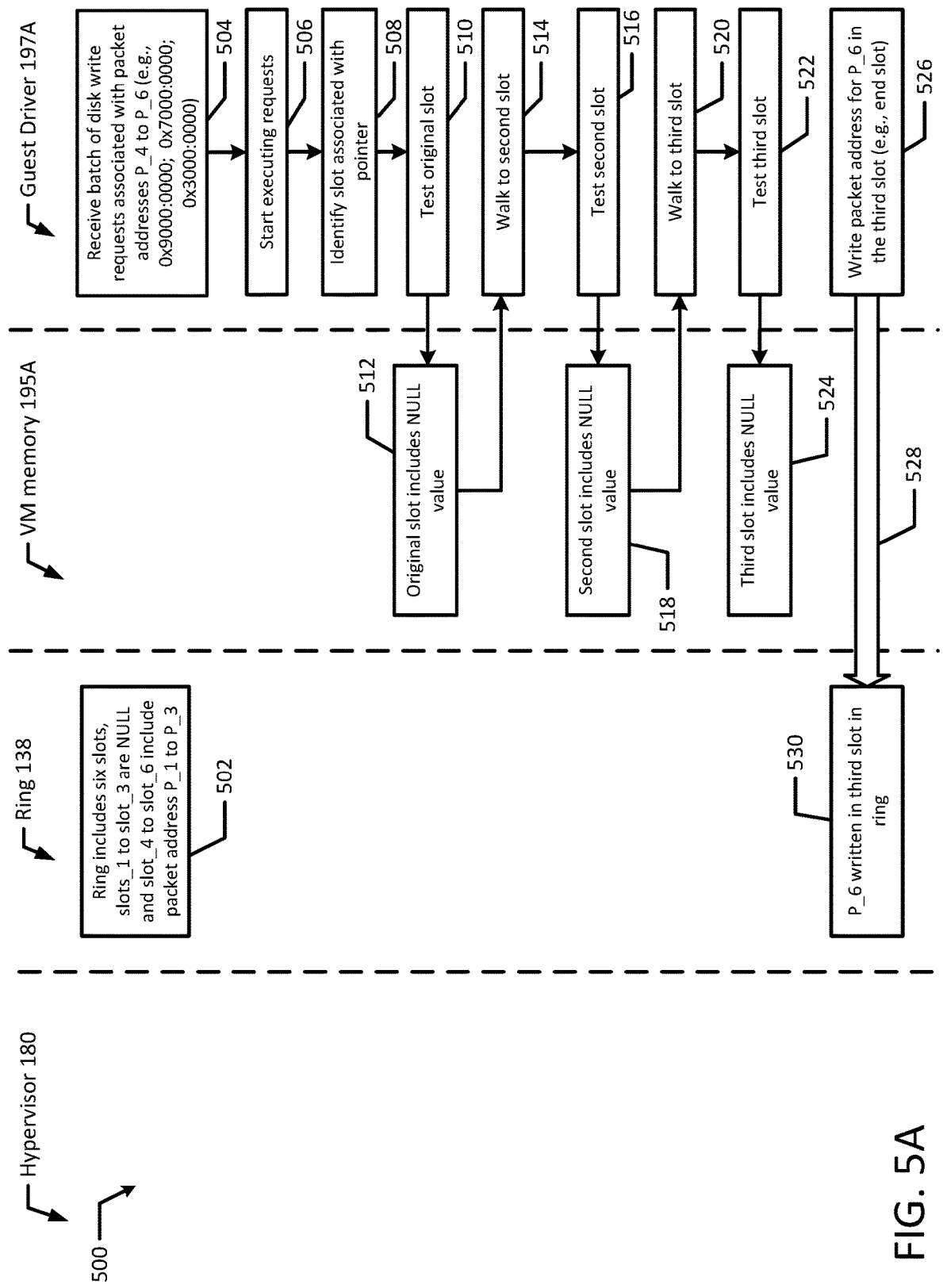
FIGS. 5A, 5B, and 5C illustrate a flow diagram of an example process for reverse order request queueing by para-virtual device drivers according to an example embodiment of the present disclosure.
Figure 5B:
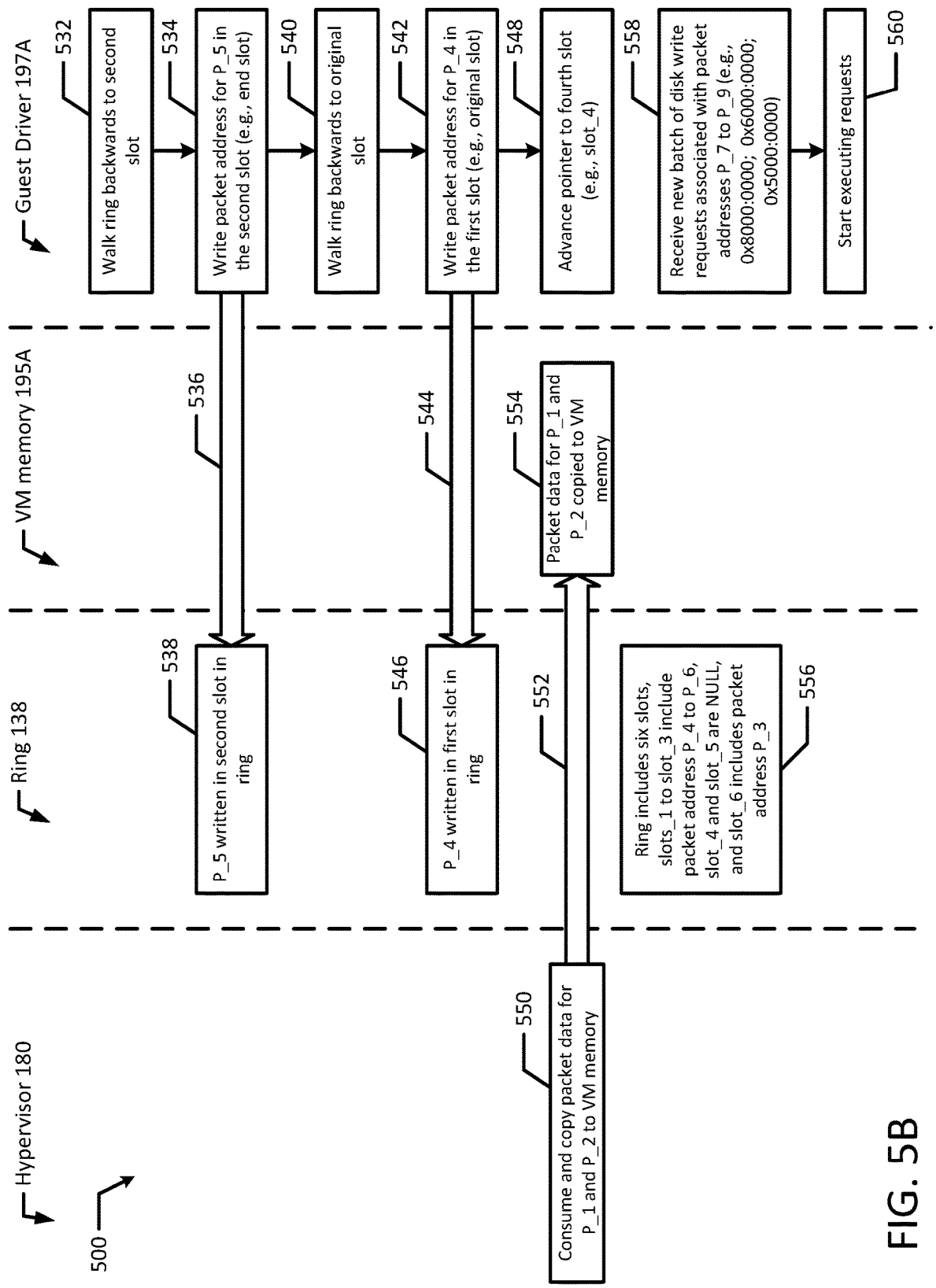
Figure 5C:
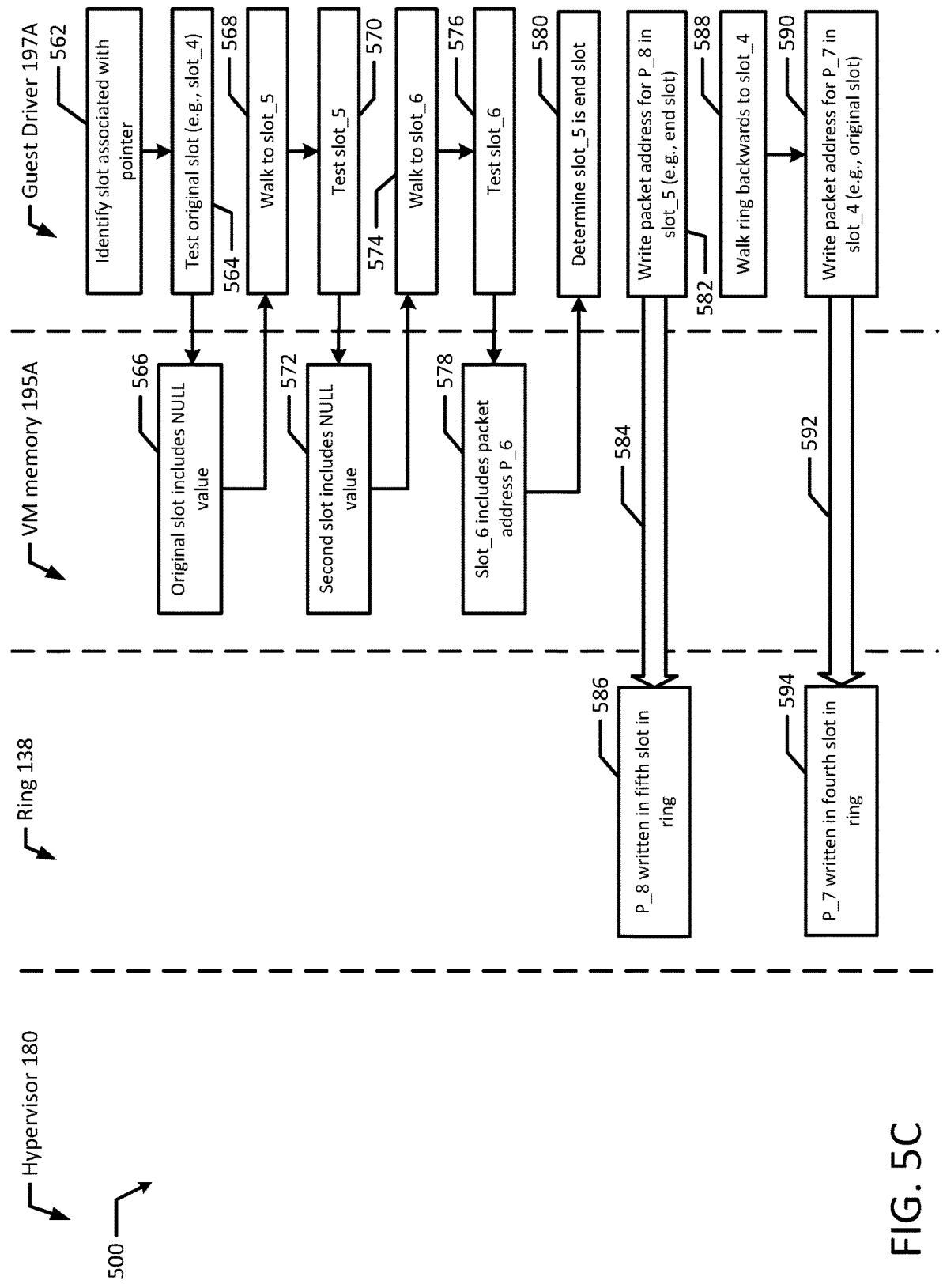

FIGS. 5A, 5B, and 5C illustrate a flowchart of an example method 500 for reverse order request queueing by para-virtual device drivers in accordance with an example embodiment of the present disclosure. Although the example method 500 is described with reference to the flowchart illustrated in FIGS. 5A, 5B, and 5C it will be appreciated that many other methods of performing the acts associated with the method 500 may be used. For example, the order of some of the blocks may be changed, certain blocks may be combined with other blocks, one or more blocks may be repeated, and some of the blocks described are optional. For example, a hypervisor 180 and a guest driver 197A may communicate with a ring buffer 138 and virtual machine memory 195A to perform example method 500.

In the illustrated example, the ring 138 includes six slots, where slot_1 to slot_3 are available (e.g., invalid or NULL) and packet addresses P_1 to P_3 are stored in slot_4 to slot_6 (block 502). Packet addresses P_1 to P_3 may have been written to the ring buffer 138 from disk write requests (e.g., R_1 to R_3). In an example, a memory address of "0" may represent a NULL value. Additionally, in slot_1 to slot_3 may be recently consumed slots (e.g., had packet addresses that were copied and invalidated or had valid descriptors cleared by the hypervisor 180). The guest driver 197A may receive a batch 301 of disk write requests associated with packet addresses P_4 to P_6 (block 504). For example, the guest driver 197A may receive a batch 301 of disk write requests with packet addresses 0x9000:0000, 0x7000:0000, and 0x3000:0000 corresponding to packet addresses P_4 to P_6. Then, the guest driver 197A may start executing requests (block 506). In an example, the guest driver 197A may start executing disk write requests (e.g., producing packet addresses) after receiving the batch 301 of disk write requests.

To start executing requests, the guest driver 197A may identify the slot associated with a pointer (block 508). For example, the guest driver 197A may identify the slot indicated by the pointer (e.g., an original slot), which is preferably the next available slot after the last full slot (e.g., slot that includes a non-NULL memory entry). For example, if the ring buffer 138 is typically filled from slot_1 to slot_6, then in the illustrated example, the pointer would indicate slot_1 (e.g., the next available slot after slot_6) such that packet addresses associated with disk write requests can sequentially be stored in slot_1 to slot_3. Then, the guest driver 197A may test the original slot (e.g., slot_1) (block 510). For example, the guest driver 197A may test slot_1 to determine the value of the memory entry or packet address in the slot. In the illustrated example, the first slot includes a NULL value or "0" value (block 512). For example, the guest driver 197A may read slot_1 while testing the first slot or original slot to determine that the first slot includes a packet address of "0".

After determining that the original slot includes a NULL value, the guest driver 197A may walk to the second slot (e.g., slot_2) (block 514). For example, the guest driver 197A may advance to the second slot using a walk function. Then, the guest driver 197A may test the second slot (e.g., slot_2) (block 516). For example, the guest driver 197A may test slot_2 to determine the value of the memory entry or packet address in the slot. In the illustrated example, the second slot includes a NULL value or "0" value (block 518). For example, the guest driver 197A may read slot_2 while testing the second slot to determine that the second slot includes a packet address of "0". After determining that the second slot includes a NULL value, the guest driver 197A may walk to the third slot (e.g., slot_3) (block 520). Similar to above, the guest driver 197A may advance to the third slot using a walk function. Then, the guest driver 197A may test the third slot (e.g., slot_3) (block 522). For example, the guest driver 197A may test slot_3 to determine the value of the memory entry or packet address in the slot. In the illustrated example, the third slot includes a NULL value or "0" value (block 524). The guest driver 197A may read slot_3 while testing the third slot to determine that the third slot includes a packet address of "0".

Since there is an adequate quantity of available slots (e.g., invalid value slots or empty slots) to accommodate each request (e.g., to store packets associated with packet addresses P_4 to P_6 from disk write requests R_4 to R_6) in the batch 301 of requests, the guest driver 197A may execute the entire batch 301 of requests and write each packet address associated with the batch 301 in the ring buffer 138. In the illustrated example, the guest driver 197A writes packet address for P_6 in the third slot (e.g., end slot) (blocks 526 and 528). For example, the guest driver 197A may write packet addresses P_4 to P_6 in the ring buffer 138 in reverse order while walking the ring 138 backwards from slot_3 (e.g., end slot) to slot_1 (e.g. original slot). Then, P_6 is written in the third slot in the ring buffer 138 (block 530). For example, the guest driver 197A may store packet address P_6 in the ring 138 by writing the packet address into the slot (e.g., replacing NULL value with packet address). In the illustrated example, the ring 138 now includes NULL values in the slot_1 and slot_2 and has packet addresses P_6 and P_1 to P_3 in slot_3 to slot_6.

Then, the guest driver 197A walks the ring backwards to the second slot (e.g., slot_2) (block 532). In an example, the guest driver 197A may walk the ring buffer 138 backwards via a walk command or walk function. Then, the guest driver 197A writes packet address for P_5 in the second slot (e.g., slot_2) (blocks 534 and 536). The guest driver 197A may store packet addresses P_5 in the ring 138 by writing the packet address into the slot (e.g., replacing NULL value with packet address). Then, P_5 is written in the third slot in the ring buffer 138 (block 538). In the illustrated example, the ring 138 now includes six slots with a NULL values in the slot_1 and has packet addresses P_5, P_6 and P_1 to P_3 in slot_2 to slot_6. Similarly, the guest driver 197A may walk the ring buffer 138 backwards to the first slot or original slot (e.g., slot_1) (block 540). In an example, the guest driver 197A may walk the ring buffer 138 backwards via a walk command or walk function. Then, the guest driver 197A writes packet address for P_4 in the first slot or original slot (e.g., slot_1) (blocks 542 and 544). The guest driver 197A may store packet addresses P_4 in the ring 138 by writing the packet address into the slot (e.g., replacing NULL value with packet address). Then, P_4 is written in the first slot in the ring buffer 138 (block 546). In the illustrated example, the ring 138 now includes six slots with packet addresses P_4 to P_6 and P_1 to P_3 in slot_1 to slot_6. Executing or processing the disk write requests (e.g., producing the memory entries, such as data packets) in batches or groups advantageously improves performance and throughput without increasing ring size of ring buffer 138, especially when a driver is not highly optimized and receiving and executing requests is slower than transmitting or copying packets.

Then, the guest driver 197A may advance the pointer to the fourth slot (e.g., slot_4) (block 548). For example, the guest driver 197A may advance the pointer to the slot after the last filled slot (e.g., slot_4 since the guest driver 197A last filled slot_3), which will indicate to the guest driver 197A where to start adding new packets in the future. In an example, the guest driver 197A may wait to advance the pointer to slot_4 until after the slot is consumed (e.g., P_1 is copied and invalidated by the hypervisor 180). By maintaining the pointer location, the guest driver 197A may advantageously execute disk write requests and store packets or packet addresses in the ring buffer 138 in sequential order, as they are received in the batches 301, such that data is consumed by the hypervisor 180 sequentially.

The hypervisor 180 consumes and copies packet data for P_1 and P_2 to VM memory 195A (blocks 550 and 552). For example, the hypervisor 180 may retrieve packet addresses P_1 and P_2 from slot_1 and slot_2, and then copy the packets associated with packet addresses P_1 and P_2 to VM memory 195A. Additionally, consuming packets may include invalidating slot_1 and slot_2. In an example, the packet data may be copied to VM memory 195A from a temporary memory location. Then, packet data for P_1 and P_2 is copied to VM memory 195A (block 554). In an example, packet data for P_1 and P_2 may be copied to VM memory 195A in a batch. Additionally, packet data for P_1 and P_2 may be copied to VM memory 195A sequentially as each packet address is retrieved by the hypervisor 180. The hypervisor 180 may wait until an entire batch 301 of requests is executed or processed before consuming additional packets to ensure that adequate spacing is maintained between slots accessed by the guest driver 197A and the hypervisor 180 to help further reduce the frequency of cache line bounces.

After the hypervisor 180 consumes packets P_1 and P_2, the six slots of the ring buffer 138 include packet addresses P_4 to P_6 in slot_1 to slot_3, slot_4 and slot_5 are NULL, and slot_6 includes packet address P_3 (block 556). Hypervisor 180 may consume additional packets, for example, continuing in order to consume packet P_3 and so forth. Additionally, the guest driver 197A may receive additional batches 301 of requests and execute the disk write requests by producing the packets addresses associated with the requests to the empty slots in the ring buffer 138. In the illustrated example, the guest driver 197A receives a new batch 301 of disk write requests associated with packet addresses P_7 to P_9 (block 558). For example, the guest driver 197A may receive a new batch 301 of disk write requests with packet addresses 0x8000:0000, 0x6000:0000, and 0x5000:0000 corresponding to packet addresses P_7 to P_9. Then, the guest driver 197A may start executing requests (block 560). In an example, the guest driver 197A may start executing requests (e.g., producing packet addresses) immediately after receiving the batch 301 of requests. In another example, the guest driver 197A may start executing requests after a predetermined amount of time or after receiving an instruction to process or execute the batch 301 of requests.

To start executing requests from the new batch 301, the guest driver 197A may identify the slot associated with a pointer (block 562). For example, the guest driver 197A may identify the slot indicated by the pointer (e.g., a new original slot), which is preferably the next available slot after the last full slot (e.g., slot that includes a non-NULL memory entry). For example, in the illustrated example, the pointer would indicate slot_4 (e.g., the next available slot after slot_3) since slot_3 was the last slot filled by the guest driver 197A. Then, the guest driver 197A may test the original slot (e.g., slot_4) (block 564). For example, the guest driver 197A may test slot_4 to determine the value of the memory entry or packet address in the slot. In the illustrated example, the fourth slot includes a NULL value or "0" value (block 566). For example, the guest driver 197A may read slot_4 while testing the fourth slot or new original slot to determine that the fourth slot includes a packet address of "0".

After determining that the original slot includes a NULL value, the guest driver 197A may walk to the fifth slot (e.g., slot_5) (block 568). For example, the guest driver 197A may advance to the fifth slot using a walk function. Then, the guest driver 197A may test the fifth slot (e.g., slot_5) (block 570). For example, the guest driver 197A may test slot_5 to determine the value of the memory entry or packet address in the slot. In the illustrated example, the fifth slot includes a NULL value or "0" value (block 572). For example, the guest driver 197A may read slot_5 while testing the fifth slot to determine that the second slot includes a packet address of "0". After determining that the fifth slot includes a NULL value, the guest driver 197A may walk to the sixth slot (e.g., slot_6) (block 574). Similar to above, the guest driver 197A may advance to the sixth slot using a walk function. Then, the guest driver 197A may test the sixth slot (e.g., slot_6) (block 576). For example, the guest driver 197A may test slot_6 to determine the value of the memory entry or packet address in the slot. In the illustrated example, the sixth slot includes a packet address for P_6 (e.g., 0x3000:0000) (block 578). For example, the guest driver 197A may read slot_6 while testing the first slot to determine that the sixth slot includes a packet address of 0x3000:0000. The guest driver 197A walks to the sixth slot because there are three disk write requests in the new batch 301, and with each slot storing a packet address for a packet, the guest driver 197A walks forward the same quantity of slots as disk write requests in the batch 301, which in this example are each associate with a single, or until encountering an unavailable or busy slot before that point.

In other examples, a disk write request may include multiple packet addresses (e.g., two packet addresses) such that each disk write request would correspond to two slots in the ring buffer 138. If each disk write request included instructions to write two packet addresses to the disk, then a batch 301 of three requests may be completely accommodated by six empty or available slots in the ring buffer 138.

Upon testing a busy (e.g., non-NULL value, 0x3000: 0000) slot, the guest driver 197A determines that slot_5 is the end slot (block 580). Similarly, the guest driver 197A may determine that disk write request R_8 associated with packet P_8 is the last request from the batch 301 that can be executed and thus P_8 is the last packet address that can be written in the ring buffer 138. For example, upon receiving a non-NULL value, the guest driver 197A may stop testing slots. A non-NULL value may indicate that the remainder of the ring is full and that there are currently no additional available or empty slots that packets can be written into. In an example, the guest driver 197A may be paused or may wait before attempting to execute or process additional requests (e.g., produce additional memory entries). For example, after testing a slot and receiving or reading a non-NULL value, a timer may start and count up to a predetermined timespan (e.g., 25 milliseconds, one second, 20 seconds) before the guest driver 197A attempts to execute or process additional requests. For example, the guest driver 197A may wait and then retry to execute the remaining requests in the new batch 301. Additionally, the unexecuted requests may be discarded, sent back to the user, or temporarily stored so that the requests can be executed or processed at a later time.

In the illustrated example, the guest driver 197A writes packet address for P_8 in the fifth slot (e.g., end slot) (blocks 582 and 584). The guest driver 197A may write packet addresses P_8 to P_7 in the ring buffer 138 in reverse order while walking the ring 138 backwards from slot_5 (e.g., new end slot) to slot_4 (e.g. new original slot). Then, P_8 is written in the fifth slot in the ring buffer 138 (block 586). For example, the guest driver 197A may store packet addresses P_8 in the ring 138 by writing the packet address into the slot (e.g., replacing NULL value with packet address). Then, the guest driver 197A walks the ring backwards to the fourth slot (e.g., slot_4) (block 588). In an example, the guest driver 197A may walk the ring buffer 138 backwards via a walk command or walk function. Then, the guest driver 197A writes packet address for P_7 in the fourth slot (e.g., slot_4) (blocks 590 and 592). The guest driver 197A may store packet addresses P_7 in the ring 138 by writing the packet address into the slot (e.g., replacing NULL value with packet address). Then, P_7 is written in the fourth slot in the ring buffer 138 (block 594). For example, the six slots of ring 138 now includes six slots with a packet address P_3 in slot_6 and packet addresses P_4 to P_8 in slot_1 to slot_5.

In other examples, blocks or steps performed by and/or attributed to a guest driver 197 in method 400, method 450 and/or method 500 may instead be performed by and/or attributed to a guest operating system 196.

Figure 6:
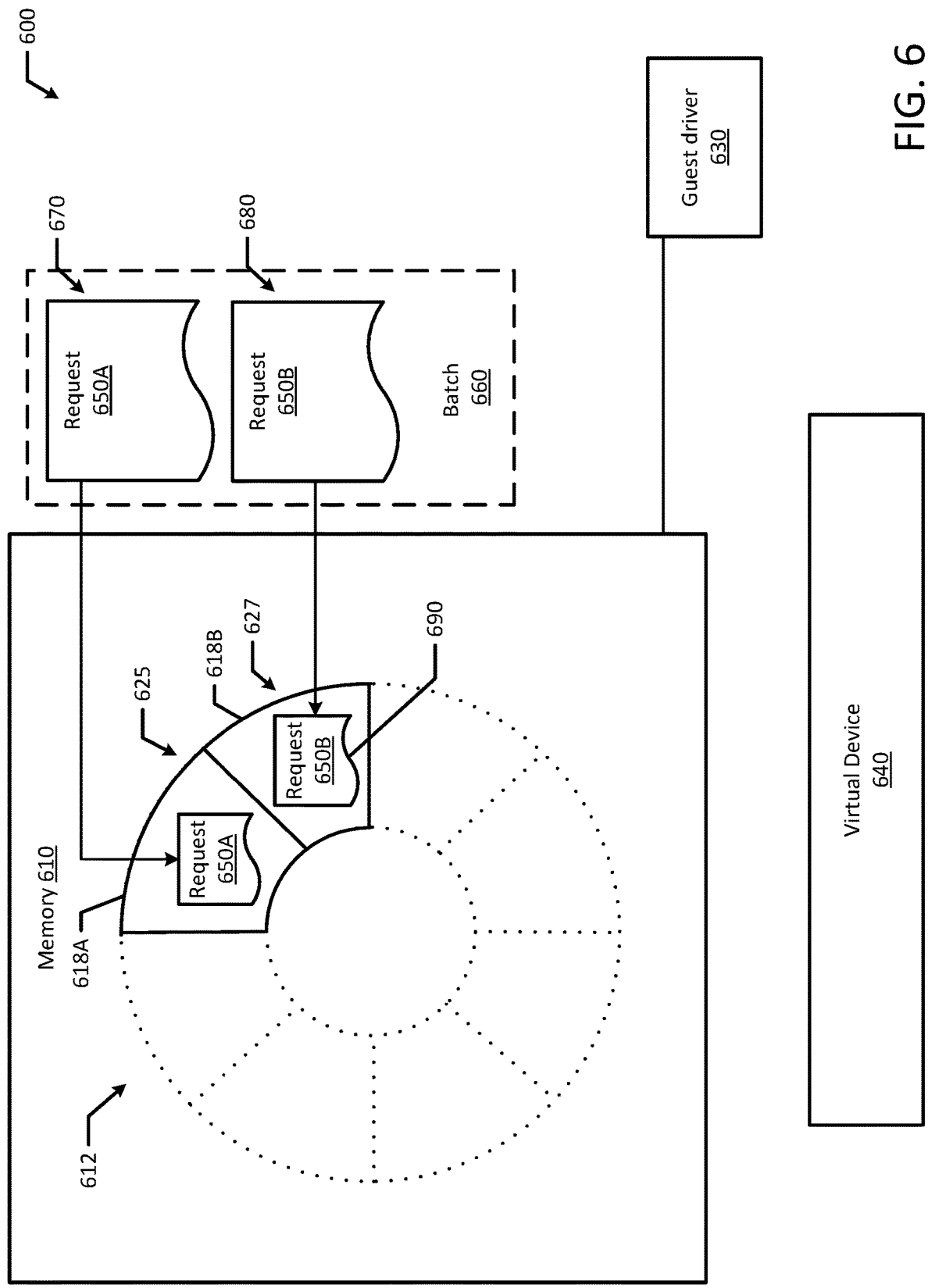
FIG. 6 illustrates a block diagram of an example reverse order request queueing system according to an example embodiment of the present disclosure.

FIG. 6 is a block diagram of an example reverse order request queueing system 600 according to an example embodiment of the present disclosure. The reverse order request queueing system 600 includes a memory 610 including a ring buffer 612 having a plurality of slots 618A-B. The ring buffer 612 may have any appropriate number of slots, which may vary depending on application. The reverse order request queueing system 600 may also include a guest driver 630 associated with the ring buffer 612. The ring buffer 612 may be associated with a virtual device 640. The guest driver 630 may be configured to detect that the guest driver 630 is running on the virtual device 640. The guest driver may also be configured to receive a batch 660 of requests (e.g., requests 650A-B) having an initial memory request 670 (e.g., request 650A) and a final request 680 (e.g., request 650B) ending the batch 660 of requests. The batch 660 of requests may also include intervening requests between the initial memory request 670 and the final request 680. Additionally, the guest driver 630 is configured to walk the ring buffer 612 starting from an original slot 625. Further, the guest driver 630 is configured to identify a last request 690 (e.g., request 650B, which may correspond to the final request 680 in the batch 660 of requests) in the batch 660 of requests 650A-B that can be accommodated by an available slot (e.g., slot 618A-B) in the ring buffer 612, walk the ring buffer 612 backwards from an end slot 627 associated with the last request 690 (e.g., request 650B) to the original slot 625, and execute each respective request (e.g., requests 650A-B) from the last request to the initial request 670 (e.g., request 650A) for each respective slot from the end slot 627 to the original slot 625 in the ring buffer 612. The end slot 627 is either a slot associated with the final request 680 (e.g., request 650B) ending the batch 660 of requests or a slot preceding an unavailable slot (e.g., a slot with a non-NULL value). In an example, the testing is conducted while the contents of each slot (e.g., slots 618A-B) remain unchanged.

Instead of a cache line constantly bouncing between the guest driver 630 and a hypervisor, which implements virtual devices 640, the guest driver 630 advantageously executes multiple requests 650 (e.g., produces multiple memory entries associated with the requests 650) from a batch 660 of requests (e.g., 2, 3, 8, 16 requests) at a time, thereby allowing multiple disk write or memory entry operations before the cache line bounces to the hypervisor, which improves performance and throughput without increasing the size of the ring buffer 612. For example, the above guest driver 630 modification may improve packet throughput by approximately ten percent or more.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st exemplary aspect of the present disclosure, a system includes a memory including a ring buffer having a plurality of slots and a guest driver associated with the ring buffer. The ring buffer is associated with a virtual device and the guest driver is configured to detect that the guest driver is running on the virtual device, receive a batch of requests having an initial request and a final request ending the batch of requests, walk the ring buffer starting from an original slot, identify a last request in the batch of requests that can be accommodated by an available slot in the ring buffer, walk the ring buffer backwards from an end slot associated with the last request to the original slot, and execute each respective request from the last request to the initial request for each respective slot from the end slot to the original slot in the ring buffer. The end slot is either a first slot associated with the final request ending the batch of requests or a second slot preceding an unavailable slot.

In a 2nd exemplary aspect of the present disclosure, which may be used in combination with any one or more of the preceding aspects (e.g., the 1st aspect), an unavailable slot includes a non-NULL value. Upon receiving a non-NULL value while walking the ring, the guest driver is configured to queue the respective request, defer execution of the respective request, and/or report an error.

In a 3rd exemplary aspect of the present disclosure, which may be used in combination with any one or more of the preceding aspects (e.g., the 1st aspect), the system further includes a hypervisor configured to retrieve contents associated with each respective request from the end slot to the original slot and copy the contents from the end slot to the original slot to a different memory.

In a 4th exemplary aspect of the present disclosure, which may be used in combination with any one or more of the preceding aspects (e.g., the 1st aspect), the last request and the final request are the same.

In a 5th exemplary aspect of the present disclosure, which may be used in combination with any one or more of the preceding aspects (e.g., the 1st aspect), the available slot includes a NULL value.

In a 6th exemplary aspect of the present disclosure, which may be used in combination with any one or more of the preceding aspects (e.g., the 1st aspect), the original slot is indicated by a pointer.

In a 7th exemplary aspect of the present disclosure, which may be used in combination with any one or more of the preceding aspects (e.g., the 6th aspect), the pointer is an index.

In an 8th exemplary aspect of the present disclosure, which may be used in combination with any one or more of the preceding aspects (e.g., the 1st aspect), the system further includes a batch counter configured to count requests and send the batch of requests to the device driver.

In a 9th exemplary aspect of the present disclosure, which may be used in combination with any one or more of the preceding aspects (e.g., the 1st aspect), the batch of requests are either disk write requests or memory entries.

In a 10th exemplary aspect of the present disclosure, which may be used in combination with any one or more of the preceding aspects (e.g., the 1st aspect), the memory entries are packet addresses.

In an 11th exemplary aspect of the present disclosure, which may be used in combination with any one or more of the preceding aspects (e.g., the 1st aspect), the guest driver is configured to detect that the guest driver is running on a virtual device by reviewing a vendor ID.

Aspects of the subject matter described herein may be useful alone or in combination with one or more other aspects described herein. In a 12th exemplary aspect of the present disclosure, a method includes detecting, by a guest driver, that the guest driver is running on a virtual device. Additionally, the guest driver receives a batch of requests having an initial request and a final request ending the batch of requests, walks a ring buffer starting from an original slot, identifies a last request in the batch of requests that can be accommodated by an available slot in the ring buffer, walks the ring buffer backwards from an end slot associated with the last request to the original slot, and executes each respective request from the last request to the initial request for each respective slot from the end slot to the original slot in the ring buffer. The end slot is either a first slot associated with the final request ending the batch of requests or a second slot preceding an unavailable slot.

In a 13th exemplary aspect of the present disclosure, which may be used in combination with any one or more of the preceding aspects (e.g., the 12th aspect), an unavailable slot includes a non-NULL value. Upon receiving a non-NULL value when walking the ring, the guest driver queues the respective request, defers execution of the respective request, and/or reports an error.

In a 14th exemplary aspect of the present disclosure, which may be used in combination with any one or more of the preceding aspects (e.g., the 12th aspect), the method further includes retrieving, by a hypervisor, content associated with the initial request and copying, by the hypervisor, the content associated with the initial request to a memory.

In a 15th exemplary aspect of the present disclosure, which may be used in combination with any one or more of the preceding aspects (e.g., the 12th aspect), a hypervisor starts processing the content associated with the batch of requests after the whole batch of requests have been executed by the guest driver.

In a 16th exemplary aspect of the present disclosure, which may be used in combination with any one or more of the preceding aspects (e.g., the 12th aspect), identifying the last request includes testing a respective value associated with a respective content of each slot in the ring buffer from the original slot to the first slot, wherein the testing is conducted while the contents of each slot remain unchanged.

In a 17th exemplary aspect of the present disclosure, which may be used in combination with any one or more of the preceding aspects (e.g., the 16th aspect), the method further includes responsive to testing an unavailable slot, pausing, by the guest driver, a predetermined timespan before testing the slot again.

In an 18th exemplary aspect of the present disclosure, which may be used in combination with any one or more of the preceding aspects (e.g., the 12th aspect), the original slot is indicated by a pointer.

In a 19th exemplary aspect of the present disclosure, which may be used in combination with any one or more of the preceding aspects (e.g., the 18th aspect), the pointer is maintained in a cache line.

In a 20th exemplary aspect of the present disclosure, which may be used in combination with any one or more of the preceding aspects (e.g., the 18th aspect), the pointer is an index.

In a 21st exemplary aspect of the present disclosure, which may be used in combination with any one or more of the preceding aspects (e.g., the 18th aspect), the method further includes advancing, by the guest driver, the pointer to the end slot.

In a 22nd exemplary aspect of the present disclosure, which may be used in combination with any one or more of the preceding aspects (e.g., the 12th aspect), the batch of requests are received in response to a batch counter counting to a threshold quantity of requests.

In a 23rd exemplary aspect of the present disclosure, which may be used in combination with any one or more of the preceding aspects (e.g., the 12th aspect), detecting that the guest driver is running on a virtual device includes reviewing a vendor ID.

Aspects of the subject matter described herein may be useful alone or in combination with one or more other aspects described herein. In a 24th exemplary aspect of the present disclosure, a non-transitory machine readable medium stores code, which when executed by a guest driver, is configured to detect that the guest driver is running on a virtual device, receive a batch of requests having an initial request and a final request ending the batch of requests, walk a ring buffer starting from an original slot, identify a last request in the batch of requests that can be accommodated by an available slot in the ring buffer, walk the ring buffer backwards from an end slot associated with the last request to the original slot, and execute each respective request from the last request to the initial request for each respective slot from the end slot to the original slot in the ring buffer. The end slot is either a first slot associated with the final request ending the batch of requests or a second slot preceding an unavailable slot.

In a 25th exemplary aspect of the present disclosure, which may be used in combination with any one or more of the preceding aspects (e.g., the 24th aspect), an unavailable slot includes a non-NULL value. Upon receiving a non-NULL value when walking the ring, the guest driver is configured to queue the respective request, defer execution of the respective request, and/or report an error.

In a 26th exemplary aspect of the present disclosure, which may be used in combination with any one or more of the preceding aspects (e.g., the 24th aspect), the non-transitory machine readable medium stores code, which when executed by a hypervisor, is configured to retrieve content associated with the initial request and copy the content associated with the initial request to a memory.

In a 27th exemplary aspect of the present disclosure, which may be used in combination with any one or more of the preceding aspects (e.g., the 24th aspect), the non-transitory machine readable medium stores code, which when executed by a hypervisor, is configured to start processing the content associated with the batch of requests after the whole batch of requests have been executed by the guest driver.

In a 28th exemplary aspect of the present disclosure, which may be used in combination with any one or more of the preceding aspects (e.g., the 24th aspect), identifying the last request includes testing a respective value associated with a respective content of each slot in the ring buffer from the original slot to the first slot. The testing is conducted while the contents of each slot remain unchanged.

In a 29th exemplary aspect of the present disclosure, which may be used in combination with any one or more of the preceding aspects (e.g., the 24th aspect), the original slot is indicated by a pointer and the guest driver is further configured to advance the pointer to the end slot.

In a 30th exemplary aspect of the present disclosure, which may be used in combination with any one or more of the preceding aspects (e.g., the 24th aspect), detecting that the guest driver is running on a virtual device includes reviewing a vendor ID.

Aspects of the subject matter described herein may be useful alone or in combination with one or more other aspects described herein. In a 31st exemplary aspect of the present disclosure, a system includes a means for detecting that a guest driver is running on a virtual device, a means for receiving a batch of requests having an initial request and a final request ending the batch of requests, a means for walking a ring buffer starting from an original slot, a means for identifying a last request in the batch of requests that can be accommodated by an available slot in the ring buffer, a means for walking the ring buffer backwards from an end slot associated with the last request to the original slot, and a means for executing each respective request from the last request to the initial request for each respective slot from the end slot to the original slot in the ring buffer. The end slot is either a first slot associated with the final request ending the batch of requests or a second slot preceding an unavailable slot.

Aspects of the subject matter described herein may be useful alone or in combination with one or more other aspects described herein. In a 32nd exemplary aspect of the present disclosure, a system includes a memory including a ring buffer having a plurality of slots and a guest operating system. The guest operating system is configured to determine that a guest driver is running on a virtual device, receive a batch of requests having an initial request and a final request ending the batch of requests, test one or more slots in a ring buffer starting at an original slot, identify a last request in the batch of requests that can be accommodated by an available slot in the ring buffer, advance from an end slot associated with the last request to the original slot, and execute each respective request from the last request to the initial request for each respective slot from the end slot to the original slot in the ring buffer. The end slot is either a first slot associated with the final request ending the batch of requests or a second slot preceding an unavailable slot.

In a 33rd exemplary aspect of the present disclosure, which may be used in combination with any one or more of the preceding aspects (e.g., the 32nd aspect), the last request and the final request are the same.

In a 34th exemplary aspect of the present disclosure, which may be used in combination with any one or more of the preceding aspects (e.g., the 32nd aspect), the available slot includes a NULL value.

In a 35th exemplary aspect of the present disclosure, which may be used in combination with any one or more of the preceding aspects (e.g., the 32nd aspect), the original slot is indicated by a pointer.

In a 36th exemplary aspect of the present disclosure, which may be used in combination with any one or more of the preceding aspects (e.g., the 32nd aspect), the pointer is an index.

In a 37th exemplary aspect of the present disclosure, which may be used in combination with any one or more of the preceding aspects (e.g., the 32nd aspect), the system further includes a batch counter configured to count requests and send the batch of requests to the device driver.

In a 38th exemplary aspect of the present disclosure, which may be used in combination with any one or more of the preceding aspects (e.g., the 32nd aspect), the batch of requests are either disk write requests or memory entries.

Aspects of the subject matter described herein may be useful alone or in combination with one or more other aspects described herein. In a 39th exemplary aspect of the present disclosure, a method includes determining, by a guest operating system, that a guest driver is running on a virtual device. The guest operating system receives a batch of requests having an initial request and a final request ending the batch of requests, tests one or more slots in a ring buffer starting at an original slot, identifies a last request in the batch of requests that can be accommodated by an available slot in the ring buffer, advances from an end slot associated with the last request to the original slot, and executes each respective request from the last request to the initial request for each respective slot from the end slot to the original slot in the ring buffer. The end slot is either a first slot associated with the final request ending the batch of requests or a second slot preceding an unavailable slot.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
 a memory including a ring buffer having a plurality of slots, wherein the ring buffer is associated with a virtual device; and
 a guest driver associated with the ring buffer, wherein the guest driver is configured to:
  detect that the guest driver is running on the virtual device,
  receive a batch of requests having an initial request and a final request ending the batch of requests,
  walk the ring buffer starting from an original slot,
  identify a last request in the batch of requests that can be accommodated by an available slot in the ring buffer,
  walk the ring buffer backwards from an end slot associated with the last request to the original slot, wherein the end slot is one of a first slot associated with the final request ending the batch of requests and a second slot preceding an unavailable slot, and
  execute each respective request from the last request to the initial request for each respective slot from the end slot to the original slot in the ring buffer.

2. The system of claim 1, wherein an unavailable slot includes a non-NULL value, and wherein upon receiving a non-NULL value while walking the ring, the guest driver is configured to at least one of queue the respective request, defer execution of the respective request, and report an error.

3. The system of claim 1, further comprising a hypervisor configured to retrieve contents associated with each respective request from the end slot to the original slot and copy the contents from the end slot to the original slot to a different memory.

4. The system of claim 1, wherein the last request and the final request are the same.

5. The system of claim 1, wherein the available slot includes a NULL value.

6. The system of claim 1, wherein the original slot is indicated by a pointer.

7. The system of claim 6, wherein the pointer is an index.

8. The system of claim 1, further comprising a batch counter configured to count requests and send the batch of requests to the device driver.

9. The system of claim 1, wherein the batch of requests are one of disk write requests and memory entries.

10. The system of claim 9, wherein the memory entries are packet addresses.

11. The system of claim 1, wherein the guest driver is configured to detect that the guest driver is running on a virtual device by reviewing a vendor ID.

12. A method comprising:
 detecting, by a guest driver, that the guest driver is running on a virtual device;
 receiving, by the guest driver, a batch of requests having an initial request and a final request ending the batch of requests;
 walking, by the guest driver, a ring buffer starting from an original slot;
 identifying, by the guest driver, a last request in the batch of requests that can be accommodated by an available slot in the ring buffer;
 walking, by the guest driver, the ring buffer backwards from an end slot associated with the last request to the original slot, wherein the end slot is one of a first slot associated with the final request ending the batch of requests and a second slot preceding an unavailable slot; and executing, by the guest driver, each respective request from the last request to the initial request for each respective slot from the end slot to the original slot in the ring buffer.

13. The method of claim 12, wherein an unavailable slot includes a non-NULL value, and wherein upon receiving a non-NULL value when walking the ring, the guest driver at least one of queues the respective request, defers execution of the respective request, and reports an error.

14. The method of claim 12, further comprising:
retrieving, by a hypervisor, content associated with the initial request; and
copying, by the hypervisor, the content associated with the initial request to a memory.

15. The method of claim 12, wherein a hypervisor starts processing the content associated with the batch of requests after the whole batch of requests have been executed by the guest driver.

16. The method of claim 12, wherein identifying the last request includes testing a respective value associated with a respective content of each slot in the ring buffer from the original slot to the first slot, wherein the testing is conducted while the contents of each slot remain unchanged.

17. The method of claim 16, further comprising responsive to testing an unavailable slot, pausing, by the guest driver, a predetermined timespan before testing the slot again.

18. The method of claim 12, wherein the original slot is indicated by a pointer.

19. The method of claim 18, further comprising advancing, by the guest driver, the pointer to the end slot.

20. A method comprising:
determining, by a guest operating system, that a guest driver is running on a virtual device;
receiving, by the guest operating system, a batch of requests having an initial request and a final request ending the batch of requests;
testing, by the guest operating system, one or more slots in a ring buffer starting at an original slot;
identifying, by the guest operating system, a last request in the batch of requests that can be accommodated by an available slot in the ring buffer;
advancing, by the guest operating system, from an end slot associated with the last request to the original slot, wherein the end slot is one of a first slot associated with the final request ending the batch of requests and a second slot preceding an unavailable slot; and
executing, by the guest operating system, each respective request from the last request to the initial request for each respective slot from the end slot to the original slot in the ring buffer.

* * * * *

UNITED STATES PATENT AND TRADEMARK OFFICE
CERTIFICATE OF CORRECTION

PATENT NO. : 10,545,697 B1
APPLICATION NO. : 16/116514
DATED : January 28, 2020
INVENTOR(S) : Michael Tsirkin It is certified that error appears in the above-identified patent and that said Letters Patent is hereby corrected as shown below:

In the Specification

In Column 10, Line 6, replace "cleared to invalid" with --cleared or invalid--.

Signed and Sealed this
Twelfth Day of May, 2020

Andrei Iancu
*Director of the United States Patent and Trademark Office*